United States Patent
Oh

(10) Patent No.: US 10,514,860 B2
(45) Date of Patent: Dec. 24, 2019

(54) MEMORY SYSTEM AND OPERATION METHOD FOR THE SAME

(71) Applicant: SK hynix Inc., Gyeonggi-do (KR)

(72) Inventor: Yoon-Jo Oh, Gyeonggi-do (KR)

(73) Assignee: SK hynix Inc., Gyeonggi-do (KR)

(*) Notice: Subject to any disclaimer, the term of this patent is extended or adjusted under 35 U.S.C. 154(b) by 63 days.

(21) Appl. No.: 15/195,520

(22) Filed: Jun. 28, 2016

(65) Prior Publication Data

US 2017/0212709 A1 Jul. 27, 2017

(30) Foreign Application Priority Data

Jan. 25, 2016 (KR) .................. 10-2016-0008683

(51) Int. Cl.
G06F 3/06 (2006.01)

(52) U.S. Cl.
CPC .......... *G06F 3/0653* (2013.01); *G06F 3/0604* (2013.01); *G06F 3/0659* (2013.01); *G06F 3/0683* (2013.01)

(58) Field of Classification Search
CPC .... G06F 3/0653; G06F 3/0604; G06F 3/0659; G06F 3/0683; G06F 3/0619; G06F 3/0679
See application file for complete search history.

(56) References Cited

U.S. PATENT DOCUMENTS

| | | | | |
|---|---|---|---|---|
| 4,342,079 A * | 7/1982 | Stewart | ............... | G06F 11/1666 711/5 |
| 5,353,256 A * | 10/1994 | Fandrich | ............. | G06F 12/1425 365/185.11 |
| 5,422,855 A * | 6/1995 | Eslick | ...................... | G11C 5/14 365/185.33 |
| 5,513,138 A * | 4/1996 | Manabe | .................. | G06K 19/07 365/185.11 |
| 5,559,988 A * | 9/1996 | Durante | ................ | G06F 3/0601 711/100 |
| 9,093,132 B2 * | 7/2015 | Kim | ......................... | G11C 7/10 |
| 2001/0018728 A1 * | 8/2001 | Topham | .............. | G06F 11/2087 711/113 |
| 2002/0188812 A1 * | 12/2002 | Sadhasivan | ......... | G06F 13/4239 711/153 |
| 2003/0095437 A1 * | 5/2003 | Imamiya | ................... | G06F 9/24 365/185.17 |
| 2003/0196043 A1 * | 10/2003 | Toussi | ................. | G06F 12/0831 711/137 |
| 2004/0034749 A1 * | 2/2004 | Jeddeloh | ................... | G06F 1/28 711/154 |

(Continued)

FOREIGN PATENT DOCUMENTS

| KR | 100532976 | 2/2006 |
|---|---|---|
| KR | 1020120052303 | 5/2012 |

OTHER PUBLICATIONS

G.R. Frazier and J.C. Pescatore, Streamlined Status Reporting Scheme for Adapter Cards, IBM, Nov. 1990, Vo. 33, No. 6A, 1990 (Year: 1990).*

*Primary Examiner* — Khoa D Doan

(74) *Attorney, Agent, or Firm* — IP & T Group LLP

(57) ABSTRACT

A memory device includes a memory unit comprising one or more storage regions, and a control logic suitable for generating status information representing individualized states for the one or more storage regions.

10 Claims, 16 Drawing Sheets

(56) References Cited

U.S. PATENT DOCUMENTS

| | | | |
|---|---|---|---|
| 2004/0042319 A1* | 3/2004 | Lee | G11C 7/1051 365/226 |
| 2005/0122768 A1* | 6/2005 | Fukumoto | B82Y 10/00 365/158 |
| 2006/0044875 A1* | 3/2006 | Ahn | G11C 16/34 365/185.22 |
| 2006/0179251 A1* | 8/2006 | Fields, Jr. | G06F 9/30003 711/144 |
| 2007/0076479 A1* | 4/2007 | Kim | G06F 13/4243 365/185.11 |
| 2007/0106834 A1* | 5/2007 | Murin | G11C 16/26 711/103 |
| 2007/0143378 A1* | 6/2007 | Gorobets | G06F 12/0246 |
| 2007/0143560 A1* | 6/2007 | Gorobets | G06F 12/0246 711/170 |
| 2007/0143561 A1* | 6/2007 | Gorobets | G06F 12/0246 711/170 |
| 2007/0153576 A1* | 7/2007 | Oh | G11C 7/1021 365/185.11 |
| 2008/0016278 A1* | 1/2008 | Clark | G06F 12/0817 711/118 |
| 2009/0172267 A1* | 7/2009 | Oribe | G11C 16/3418 711/103 |
| 2009/0313501 A1* | 12/2009 | Hallivuori | G06Q 20/341 714/15 |
| 2010/0262767 A1* | 10/2010 | Borchers | G06F 12/0246 711/103 |
| 2010/0281225 A1* | 11/2010 | Chen | G06F 9/544 711/147 |
| 2011/0099458 A1* | 4/2011 | Reche | G06F 11/073 714/763 |
| 2011/0222342 A1* | 9/2011 | Yoon | G11C 11/56 365/185.03 |
| 2012/0089805 A1* | 4/2012 | Liu | G06F 3/0643 711/173 |
| 2013/0326090 A1* | 12/2013 | Gillingham | G06F 3/0688 710/5 |
| 2014/0181417 A1* | 6/2014 | Loh | G06F 12/0828 711/141 |
| 2014/0250262 A1* | 9/2014 | Buxton | G06F 3/0659 711/103 |
| 2015/0009773 A1* | 1/2015 | Grunzke | G11C 5/147 365/230.08 |
| 2015/0293864 A1* | 10/2015 | Hill | G06F 13/22 710/109 |
| 2015/0363342 A1* | 12/2015 | Tuers | G06F 12/0238 710/117 |
| 2016/0085465 A1* | 3/2016 | Schmier | G06F 3/0619 711/103 |
| 2016/0224246 A1* | 8/2016 | Shah | G06F 3/0688 |
| 2016/0246514 A1* | 8/2016 | Nosaka | G06F 3/0611 |
| 2016/0299682 A1* | 10/2016 | Smadi | G06F 3/0488 |
| 2016/0306591 A1* | 10/2016 | Ellis | G06F 3/0653 |
| 2016/0342490 A1* | 11/2016 | Deguchi | G06F 11/2058 |
| 2017/0060429 A1* | 3/2017 | Gupta | G11C 11/40603 |
| 2017/0115908 A1* | 4/2017 | Hsiao | G11C 7/106 |

* cited by examiner

MEMORY SYSTEM AND OPERATION METHOD FOR THE SAME

CROSS-REFERENCE TO RELATED APPLICATIONS

The present application claims priority of Korean Patent Application No. 10-2016-0008683, filed on Jan. 25, 2016, which is incorporated herein by reference in its entirety.

BACKGROUND

1. Field

Exemplary embodiments of the present invention relate generally to a semiconductor designing technology.

2. Description of the Related Art

The computer environment paradigm has shifted to ubiquitous computing systems that can be used anywhere and anytime. Due to this, use of portable electronic devices, such as, for example, mobile phones, digital cameras, and notebook computers has increased rapidly These portable electronic devices generally use a memory system having one or more semiconductor memory devices (also referred to hereinafter simply as memory devices) for storing data. A memory system may be used as main or auxiliary memory device of a portable electronic device.

Memory systems using memory devices provide excellent stability, durability, high information access speed, and low power consumption, since they have no moving parts. Examples of memory systems having such advantages include universal serial bus (USB) memory devices, memory cards having various interfaces, solid state drives (SSD) and so forth.

SUMMARY

An embodiment of the present invention is directed to an apparatus and method for hierarchically generating and processing status information representing a plurality of states of a memory device in a memory system.

Another embodiment of the present invention is directed to an apparatus and method for checking out a plurality of states of a memory device by referring to a portion of status information in a memory system.

In an embodiment of the present invention, a memory device may include: a memory unit comprising one or more storage regions; and a control logic suitable for generating status information representing individualized states for the one or more storage regions.

The control logic: may perform an operation on the memory unit in response to an operation command transferred from an external device; may generate the status information corresponding to a result of the operation; and may transfer the status information to the external device.

The control logic may generate the status information and transfers the status information to the external device in response to a status read command transferred from the external device.

The status information: may include representative status information representing common states for the memory unit as a whole and detailed status information representing the plurality of individualized states for the one or more memory regions.

The control logic may transfer the detailed status information to the external device in response to an additional status read command transferred from the external device.

The representative status information may have a size of k bytes, and the detailed status information may have a size of n bytes, where k and n are natural numbers, and k is smaller than n.

The memory unit may include a plurality of planes as the storage region, and the plurality of individualized states correspond to the respective states of the planes in at least one among a write operation result status, and a cache write operation result status.

In an embodiment of the present invention, a method for operating a memory device, may include: detecting a plurality of individualized states of a memory unit comprising one or more storage regions; and generating status information representing the individualized states of the plurality of the states.

The detecting of the plurality of the individualized states of the memory unit may include: performing an operation on the memory unit in response to an operation command for the memory unit transferred from an external device; and detecting a result of the operation performed on the memory unit in response to a status read command transferred from the external device.

The generating of the status information may include: generating the status information corresponding to a detected result of the operation performed on the memory unit, and transferring the status information to the external device.

The status information: may include representative status information representing the common states; and may further include detailed status information representing the plurality of the states which are differentiated from each other.

The method may further include: transferring the detailed status information to the external device in response to an additional status read command transferred from the external device.

The representative status information may have a size of k bytes, and the detailed status information may have a size of n bytes, where k and n are a natural numbers, and k is smaller than the n.

The memory unit may include a plurality of planes as the storage region, and the plurality of states correspond to a result status including at least one of a write protection status, a busy/ready status, a write operation result status, and a cache write operation result status.

In an embodiment of the present invention, a method for operating a memory system including a memory device, may include: reading representative status information representing common states among a plurality of statuses of the memory device from the memory device; and confirming the plurality of the states of the memory device based on the representative status information.

The method may further include: transferring a status read command to the memory device to read the representative status information.

The method may further include: reading detailed status information representing the plurality of the states that are differentiated from each other from the memory device when the plurality of the states are not confirmed based on the representative status information.

The method may further include: transferring an additional status read command to the memory device to read the detailed status information.

The memory device may include a plurality of planes as the storage region, the plurality of states correspond to the respective states of the planes in at least one among a write protection status, a busy/ready status, a write operation result status, and a cache write operation result status.

The representative status information may have a size of k bytes, and the detailed status information may have a size of n bytes, where k and n are natural numbers, and k is smaller than n.

DETAILED DESCRIPTION

Figure 1:
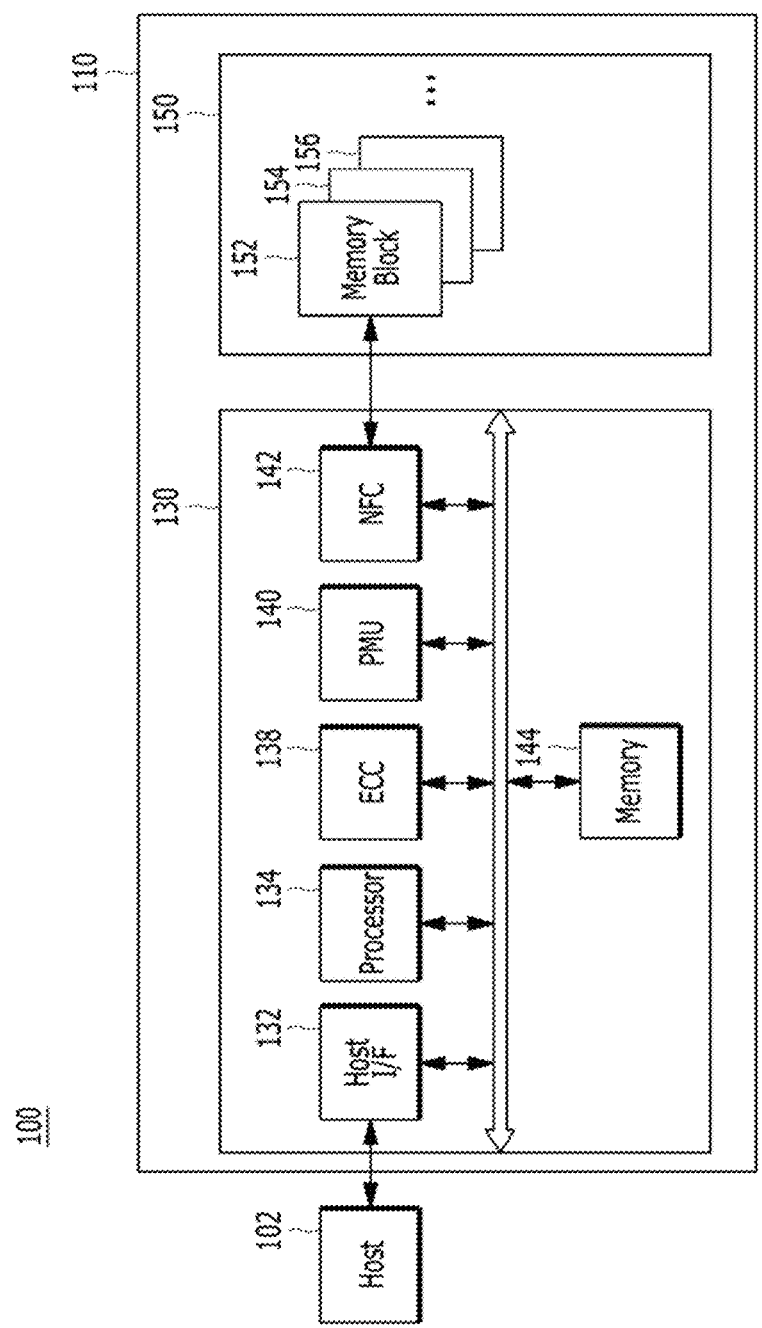
FIG. 1 is a diagram illustrating a data processing system including a memory system, according to an embodiment of the present invention.

Exemplary embodiments of the present invention will be described below in more detail with reference to the accompanying drawings. The present invention may, however, be embodied in different forms and should not be construed as being limited to the embodiments set forth herein. Rather, these embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

Unless otherwise defined, all terms including technical and scientific terms used herein have the same meaning as commonly understood by one of ordinary skill in the art to which the present invention belongs. It will be further understood that terms such as those defined in commonly used dictionaries should be interpreted as having a meaning that is consistent with their meaning in the context of the relevant art and will not be interpreted in an idealized or overly formal sense unless expressly so defined herein.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention. As used herein, singular forms are intended to include the plural forms as well, unless the context clearly indicates otherwise. It will be further understood that the terms "comprises", "comprising" "includes", and "including" when used in this specification, specify the presence of the stated elements and do not preclude the presence or addition of one or more other elements. As used herein the term "and/or" includes any and all combinations of one or more of the associated listed items.

In the following description numerous specific details are set forth in order to provide a thorough understanding of the present invention. However, the present invention may be practiced without some or all of these specific details. In other instances, well-known process structures and/or processes have not been described in detail in order not to unnecessarily obscure the present invention.

In some instances, as would be apparent to one of ordinary skill in the art elements described in connection with a particular embodiment may be used singly or in combination with other embodiments unless otherwise specifically indicated.

Hereinafter, the various embodiments of the present invention will be described in detail with reference to the attached drawings.

Referring now to FIG. 1, a data processing system 100 is provided, according to an embodiment of the present invention. The data processing system 100 may include a host 102 and a memory system 110.

The host 102 may include any suitable electronic device. For example, the host 102 may include a portable electronic device, such as, a mobile phone, an MP3 player, a laptop computer and the like. The host may include a non-portable electronic device, such as, a desktop computer, a game player a TV, a projector and the like.

The memory system 110 may store data to be accessed by the host 102 in response to a request from the host 102. The memory system 110 may be used as a main memory system or an auxiliary memory system of the host 102. The memory system 110 may be implemented to be coupled electrically with the host 102, according to a protocol of a host interface. One or more semiconductor memory devices may be used. Volatile or non-volatile memory devices may be used. For example, the memory system 110 may be implemented with a solid state drive (SSD), a multimedia card (MMC), an embedded MMC (eMMC), a reduced size MMC (RS-MMC) and a micro-MMC, a secure digital (SD) card, a mini-SID and a micro-SID, a universal serial bus (USB) storage device, a universal flash storage (UFS) device, a compact flash (CF) card, a smart media (SM) card, a memory stick, and the like.

The storage devices for the memory system 110 may be implemented with a volatile memory device, such as, a dynamic random access memory (DRAM), a static random access memory (SRAM) and the like. Alternatively, the storage devices for the to memory system 110 may be implemented with a nonvolatile memory device, such as, a read only memory (ROM) a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM) a resistive RAM (RRAM) and the like.

The memory system 110 may include a memory device 150 for storing data and a controller 130 for controlling storage of data in the memory device 150. The stored data in the memory device 150 may be accessed by the host 102.

The controller 130 and the memory device 150 may be integrated into a single semiconductor device. For instance, the controller 130 and the memory device 150 may be integrated into a semiconductor device configured as a solid state drive (SSD). Configuring the memory system 110 as a SSD, may generally allow a significant increase in an operation speed of the host 102.

The controller 130 and the memory device 150 may be integrated into a semiconductor device configured as a memory card, such as, a Personal Computer Memory Card International Association (PCMCIA) card, a compact flash (CF) card, a smart media (SM) card (SMC), a memory stick, a multimedia card (MMC), an RS-MMC and a micro-MMC, a secure digital (SD) card, a mini-SD, a micro-SD and an SDHC, a universal flash storage (UFS) device and the like.

Also, for example, the memory system 110 may be or comprise a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a three-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, an RFID device, one of various component elements configuring a computing system and the like.

The memory device 150 may store data provided from the host 102. During a read operation, the memory device 150 may provide the stored data to the host 102. One or more memory devices 150 may be employed. The one or more memory devices 150 may be substantially identical. The one or more memory devices may be different memory devices. The memory device 150 may include one or more memory blocks 152, 154 and 156. Each of the memory blocks 152, 154 and 156 may include a plurality of pages. Each of the pages may include a plurality of memory cells coupled electrically to a plurality of word lines (WL). The memory device 150 may be a nonvolatile memory device capable of retaining stored data even when a power supply is interrupted or turned off. According to an embodiment, the memory device may be a flash memory. The memory device may be a flash memory device having a three-dimensional (3D) stack structure. Examples of a non-volatile memory device 150 having a three-dimensional (3D) stack structure are described later herein with reference to FIGS. 2 to 11.

The controller 130 may control the overall operation of the memory device 150, such as, read, write, program and/or erase operations. Generally, the controller 130 may control the memory device 150 in response to a request from the host 102. For example, the controller 130 may provide data read from the memory device 150, to the host 102, in response to a read request from the host 102. Or, also as an example, the controller may store data provided from the host 102 into the memory device 150 in response to a write request.

Any suitable controller may be used, For example, the controller 130 may include a host interface unit 132, a processor 134, an error correction code (ECC) unit 138, a power management unit (PMU) 140, a NAND flash controller (NFC) 142, and a memory 144.

The host interface unit 132 may process commands and/or data provided from the host 102. The host interface unit 132 may communicate with the host 102 through at least one of various interface protocols, such as a universal serial bus (USB), a multimedia card (MMC), a peripheral component interconnect-express (PCI-E), a serial attached SCSI (SAS), a serial advanced technology attachment (SATA), a parallel advanced technology attachment (PATA), a small computer system interface (SCSI), an enhanced small disk interface (ESDI), integrated drive electronics (IDE) and the like. The host interface unit 132 may include any suitable circuits, systems devices suitable for communicating with the host 102 and the other components of the controller 130 as may be needed.

The ECC unit 138 may detect and correct errors of the data read from the memory device 150 during a read operation. Various detection and correction techniques may be employed. For example, if the number of the error bits detected by the ECC unit 138 is greater than or equal to a threshold number of correctable error bits, the ECC unit 138 may not correct the error bits and output an error correction fail signal indicating failure in correcting the error bits.

The ECC unit 138 may perform an error correction operation based on any suitable error correction scheme. For example, the ECC unit 138 may perform an error correction operation based on a coded modulation scheme, such as, for example, a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and the like. The ECC unit 138 may include any suitable circuits, systems or devices required for an error detection and correction operation.

The PMU 140 may provide and manage electric power for the controller 130. For example, the PMU 140 may provide and manage electric power for the various components of the controller 130 as may be needed.

The NFC 142 may serve as a memory interface between the controller 130 and the memory device 150 to allow the controller 130 to control the memory device 150 in response to a request from the host 102. For example, the NFC 142 may generate control signals for the memory device 150. The NFC may process data under the control of the processor 134, for example, when the memory device 150 is a flash memory especially a NAND flash memory.

The memory 144 may serve as a working memory of the memory system 110 and the controller 130, and store data for driving the memory system 110 and the controller 130. For example, when the controller 130 controls the operations of the memory device 150, the memory 144 may store data used by the controller 130 and the memory device 150 for such operations as read, write, program and erase operations.

The memory 144 may be or comprise a volatile memory. For example, the memory 144 may be or comprise a static random access memory (SRAM) or a dynamic random access memory (DRAM). As described above, the memory 144 may store data used by the host 102 and the memory device 150 for read and/or write operations. The memory 144 may be or comprise a program memory, a data memory, a write buffer, a read buffer, a map buffer, and the like.

The processor 134 may control the general operations of the memory system 110. For example, the processor 134 may control a write operation for the memory device 150, in response to a write request from the host 102, Also, for example, the processor 134 may control a read operation for the memory device 150, in response to a read request from the host 102. The processor 134 may drive a firmware, also referred to as a flash translation layer (FTL), for controlling the general operations of the memory system 110. The processor 134 may be implemented with a microprocessor, a central processing unit (CPU) and the like. Any suitable processor may be used.

For example, a management unit (not shown) may be included in the processor 134 for performing bad block management of the memory device 150. Accordingly, the management unit may find bad memory blocks included in the memory device 150, i.e., memory blocks which are in an unsatisfactory condition for further use, and perform a bad block management operation the bad memory blocks. For example, when a flash memory, such as a NAND flash memory is employed as the memory device 150, a program failure may occur during a write operation due to inherent characteristics of a NAND logic function. During a bad block management, the data of the program-failed memory blocks (e.g., the bad memory blocks) may be to programmed into a new memory block. The bad blocks due to a program fail may seriously deteriorate the utilization efficiency of a memory device, especially one having a 3D stack structure and thus negatively affect the reliability of the memory system 110.

Figure 2:
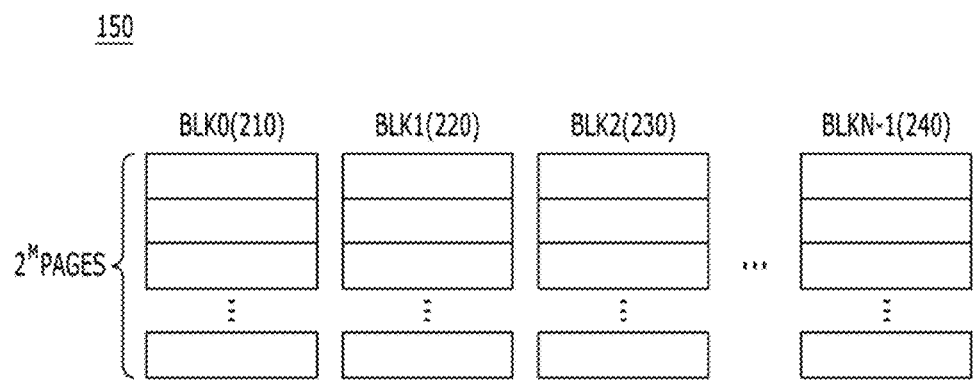
FIG. 2 is a diagram illustrating a memory device including a plurality of memory blocks, according to an embodiment of the present invention.

Referring to FIG. 2 the memory device 150 may include a plurality of memory blocks, for example, zeroth to (N−1)th blocks 210 to 240, where N is a positive integer. Each of the plurality of memory blocks 210 to 240 may include a plurality of pages, for example, $2^M$ number of pages ($2^M$ PAGES), where M is a positive integer. Each of the plurality of pages may include a plurality of memory cells to which a plurality, of word lines may be coupled electrically. It is noted that any number of suitable blocks and pages per block may be employed.

The memory blocks may be single level cell (SLC) memory blocks and/or multi-level cell (MLC) memory blocks, according to the number of bits which may be stored or expressed in each memory cell. An SLC memory block may include a plurality of pages which are implemented with memory cells each of which is capable of storing 1-bit data. An MLC memory block may include a plurality of pages which are implemented with memory cells each of which is capable of storing multi-bit data, for example, two or more-bit data. A MLC memory block including a plurality of pages which are implemented with memory cells each of which is capable of storing 3-bit data may be employed and will be referred to as a triple level cell (TLC) memory block.

Each of the plurality of memory blocks 210 to 240 may store data provided from the host device 102 during a write operation, and may provide stored data to the host 102 during a read operation.

Figure 3:
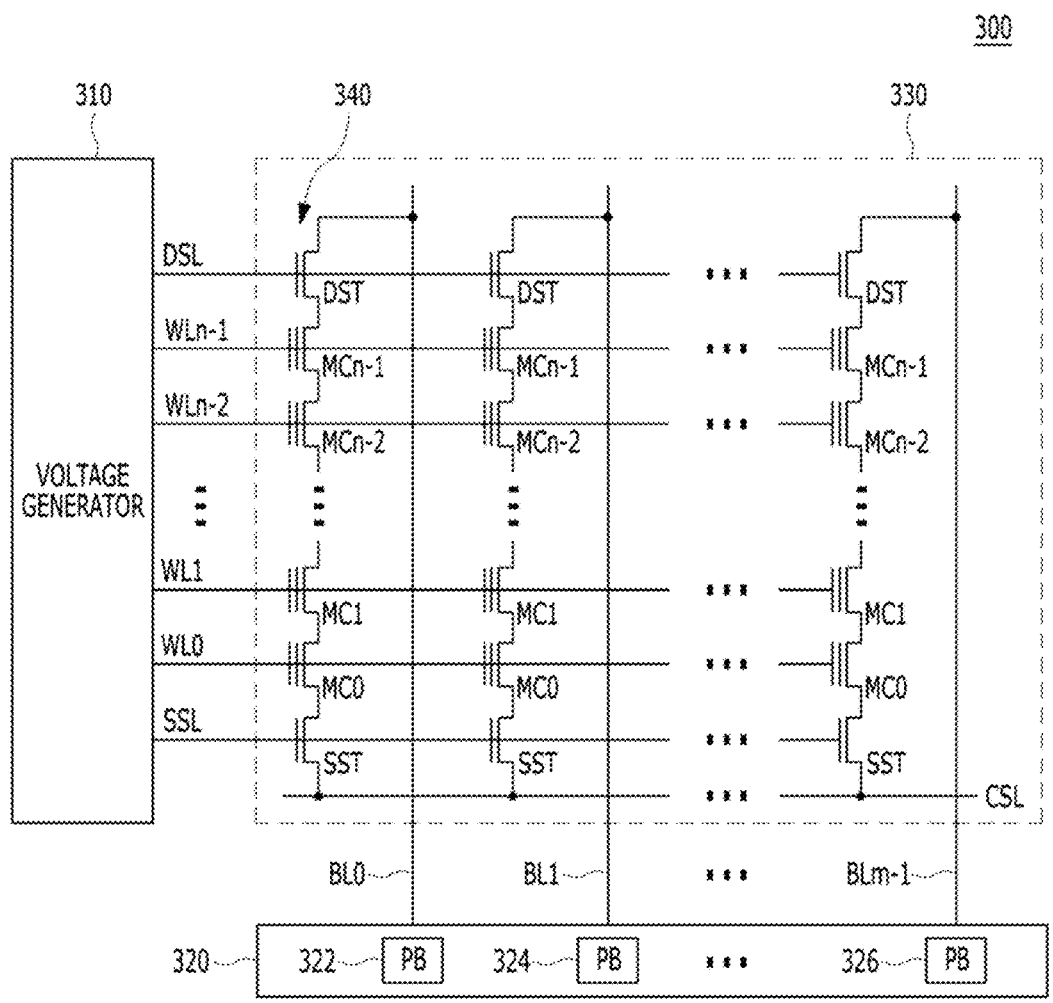
FIG. 3 is a circuit diagram illustrating a memory block in a memory device, according to an embodiment of the present invention.

Referring to FIG. 3, a memory block 152 of the memory device 150 may include a plurality of cell strings 340 coupled electrically to bit lines BL0 to BLm−1, respectively. Each cell string 340 may include at least one drain select transistor DST and at least one source select transistor SST. A plurality of memory cells or a plurality of memory cell transistors MC0 to MCn−1 may be coupled electrically in series between the select transistors DST and SST. The respective memory cells MC0 to MCn−1 may consist of multi-level cells (MLC) each of which stores data information of a plurality of bits. The memory cells may have any suitable architecture.

In FIG. 3, 'DSL' denotes a drain select line, 'SSL' denotes a source select line, and 'CSL' denotes a common source line.

FIG. 3 shows, as an example, a memory block 152 configured by NAND flash memory cells. It is to be noted, however, that the memory block 152 is not limited to NAND flash memory and may be realized, in other embodiments, by NOR flash memory, hybrid flash memory having at least two kinds of memory cells combined, or a NAND flash memory having a controller built in a memory chip. Also, the operational characteristics of a semiconductor device may be applied to not only a flash memory device in which a charge storing layer is configured by conductive floating gates but also to a charge trap flash (CTF) in which a charge storing layer is configured by a dielectric layer.

It is also noted that the memory device 150 is not limited to a flash memory device only. For example, the memory device 150 may be a DRAM or a SRAM device.

A voltage generator 310 of the memory device 150 may generate word line voltages, for example, a program voltage, a read voltage or a pass voltage, to be supplied to respective word lines according to an operation mode. The voltage generator 310 may generate voltages to be supplied to bulks, for example, well regions in which the memory cells are formed. The voltage generator 310 may perform a voltage generating operation under a control of a control circuit (not shown). The voltage generator 310 may generate a plurality of variable read voltages to generate a plurality of read data. The voltage generator 310 may select one of the memory blocks or sectors of a memory cell array, select one of the word lines of the selected memory block, and provide the word line voltages to the selected word line and unselected word lines, under the control of the control circuit.

A read/write circuit 320 of the memory device 150 may be controlled by the control circuit, and may serve as a sense amplifier or a write driver according to an operation mode. During a verification/normal read operation, the read/write circuit 320 may serve as a sense amplifier for reading data from the memory cell array. Also, during a program operation, the read/write circuit 320 may serve as a write driver for driving bit lines according to data to be stored in the memory cell array. The read/write circuit 320 may receive data to be written in the memory cell array, from a buffer (not shown), during the program operation, and may drive the bit lines according to the inputted data. To this end, the read/write circuit 320 may include a plurality of page buffers 322, 324 and 326 respectively corresponding to the columns (or bit lines) or pairs of the columns (or pairs of bit lines). Each of the page buffers 322, 324 and 326 may include a plurality of latches (not shown).

Figure 4:
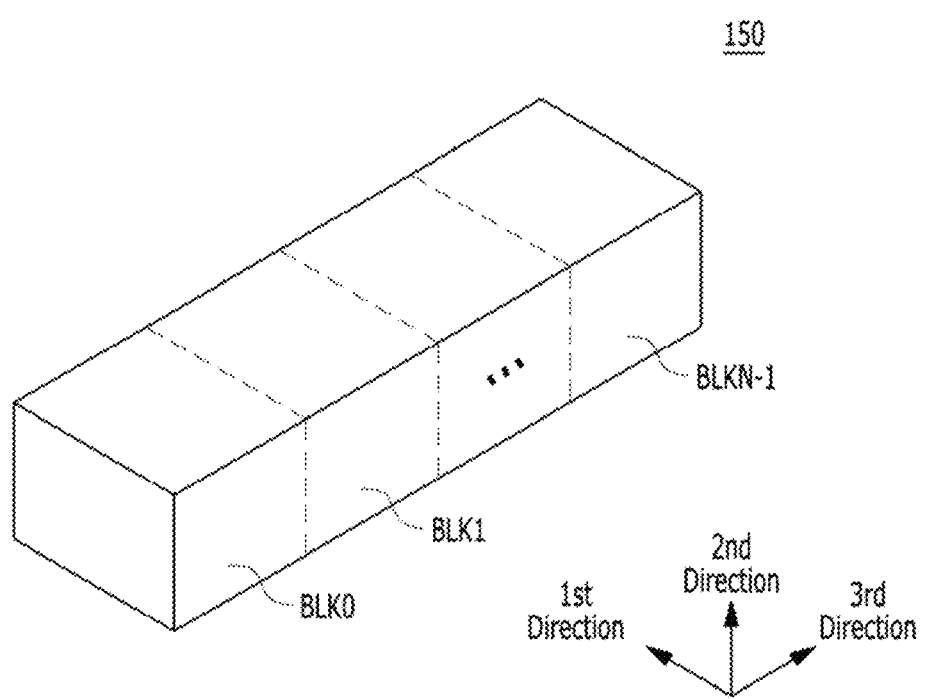
FIGS. 4 to 11 are diagrams illustrating a memory device, according to various embodiments of the present invention.

FIG. 4 is a block diagram illustrating an example of the plurality of memory blocks 152 to 156 of the memory device 150, according to an embodiment of the present invention.

As shown in FIG. 4, the memory device 150 may include a plurality of memory blocks BLK0 to BLKN−1. Each of the memory blocks BLK0 to BLKN−1 may be realized in a 3D structure or a vertical structure. The respective memory blocks BLK0 to BLKN−1 may include a plurality of structures extending in first to third directions, for example, an x-axis direction, a y-axis direction and a z-axis direction.

The respective memory blocks BLK0 to BLKN−1 may include a plurality of NAND strings NS extending in the second direction (FIG. 8), The plurality of NAND strings NS may be provided in the first direction and the third direction, Each NAND string NS may be coupled electrically to a bit line BL, at least one source select line SSL, at least one ground select line GSL, a plurality of word lines WL, at least one dummy word line DWL, and a common source line CSL. The respective memory blocks BLK0 to BLKN−1 may be coupled electrically to a plurality of bit lines BL, a plurality of source select lines SSL, a plurality of ground select lines GSL, a plurality of word lines WL, a plurality of dummy word lines DWL, and a plurality of common source lines CSL.

Figure 5:
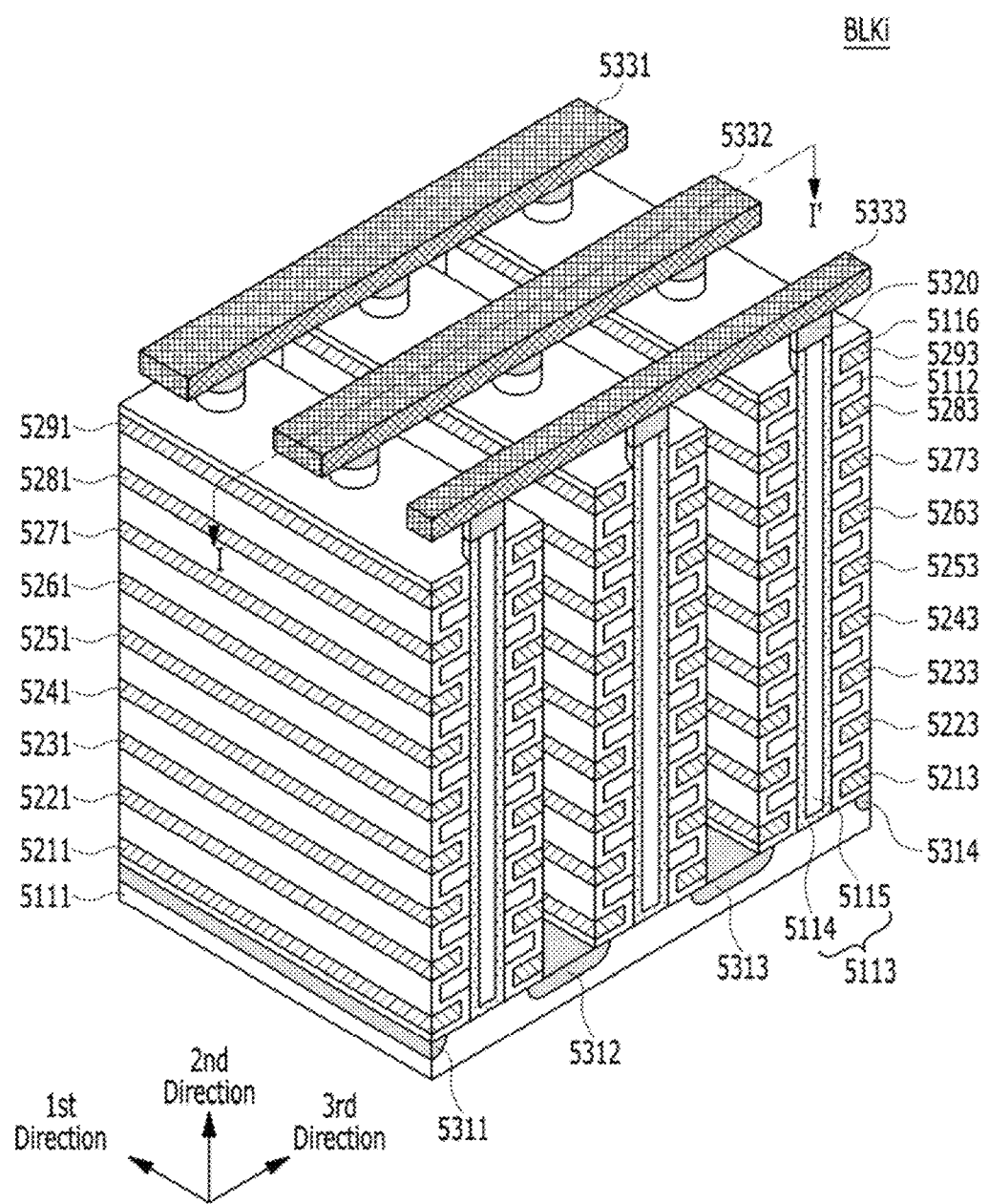
Figure 6:
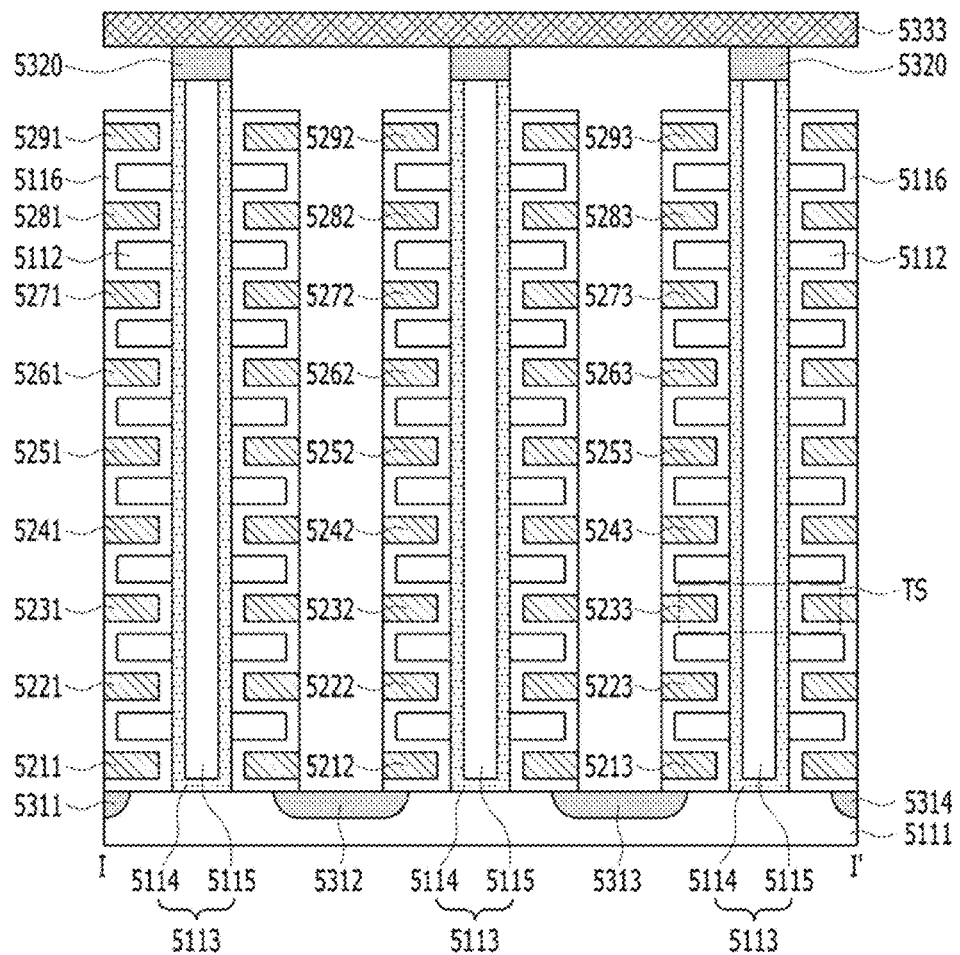

FIG. 5 is a perspective view of one memory block BLKi of the plurality memory blocks BLK0 to BLKN−1 shown in FIG. 4. FIG. 6 is a cross-sectional view taken along a line of the memory block BLKi shown in FIG. 5.

Referring to FIGS. 5 and 6, memory block BLKi may include a structure extending in the first to third directions.

The memory block may include a substrate 5111 including a silicon material doped with a first type impurity. For example, the substrate 5111 may include a silicon material doped with a p-type impurity. The substrate 5111 may be a p-type well, for example, a pocket p-well. The substrate 5111 may further include an n-type well surrounding the p-type well. Although, in the embodiment of the present invention, the substrate 5111 is exemplified as being the p-type silicon, it is to be noted that the substrate 5111 is not limited to the p-type silicon.

A plurality of doping regions 5311 to 5314 extending in the first direction may be provided over the substrate 5111. The doping regions are spaced apart at regular intervals in the third direction. The plurality of doping regions 5311 to 5314 may contain a second type to impurity that is different from that of the impurity used in substrate 5111. For example, the plurality of doping regions 5311 to 5314 may be doped with an n-type impurity. Although, in the embodiment of the present invention, first to fourth doping regions 5311 to 5314 are exemplified as being the n-type, it is noted that they are not limited to the n-type.

In the region over the substrate 5111 between the first and second doping regions 5311 and 5312, a plurality of dielectric material regions 5112 extending in the first direction may be spaced apart at regular intervals in the second direction. The dielectric material regions 5112 may also be separated from the substrate 5111 by a preset distance in the second direction. Each of the dielectric material regions 5112 may be separated from one other by a preset distance in the second direction. The dielectric materials 5112 may include any suitable dielectric material, such as, silicon oxide.

In the regions over the substrate 5111 between two consecutive doping regions, for example, between doping regions 5311 and 5312, a plurality of pillars 5113 are spaced apart at regular intervals in the first direction. The plurality of pillars 5113 extend in the second direction and may pass through the dielectric material regions 5112 so that they may be coupled electrically with the substrate 5111. Each pillar 5113 may include one or more materials. For example, each pillar 5113 may include an in inner layer 5115 and an outer surface layer 5114. The surface layer 5114 may include a doped silicon material doped with an impurity. For example, the surface layer 5114 may include a silicon material doped with the same or same type impurity as the substrate 5111, Although, in the embodiment of the present invention, the surface layer 5114 is exemplified as including p-type silicon, the surface layer 5114 is not limited to the p-type silicon and other embodiments may readily envisaged by the skilled person wherein the substrate 5111 and the surface layer 5114 of the pillars 5113 may be doped with an n-type impurity.

The inner layer 5115 of each pillar 5113 may be formed of a dielectric material. The inner layer 5115 may be or include a dielectric material such as silicon oxide.

In the regions between the first and second doping regions 5311 and 5312, a dielectric layer 5116 may be provided along exposed surfaces of the dielectric material regions 5112, the pillars 5113 and the substrate 5111. A thickness of the dielectric layer 5116 may be less than one half of the distance between the dielectric material regions 5112. In other words, a region of a material other than the dielectric material 5112 and the dielectric layer 5116 may be provided between 0) the dielectric layer 5116 below the bottom surface of a first dielectric material of the dielectric material regions 5112 and (ii) the dielectric layer 5116 provided over the top surface of a second dielectric material of the dielectric material regions 5112. The dielectric material regions 5112 may lie below the first dielectric material.

In the regions between consecutive doping regions such as in the region between the first and second doping regions 5311 and 5312, a plurality of conductive material regions 5211 to 5291 may be provided over an exposed surface of the dielectric layer 5116. The plurality of the conductive material regions extending in the first direction may be spaced apart at regular intervals in the second direction in an interleaving configuration with the plurality of the dielectric material regions 5112. The dielectric layers 5116 fill the space between the conductive material regions and the dielectric material regions 5112. So for example, the conductive material region 5211 extending in the first direction may be provided between the dielectric material region 5112 adjacent to the substrate 5111 and the substrate 5111. In particular, the conductive material region 5211 extending in the first direction may be provided between (i) the dielectric layer 5116 disposed over the substrate 5111 and (ii) the dielectric layer 5116 disposed below the bottom surface of the dielectric material region 5112 adjacent to the substrate 5111.

Each of the conductive material regions 5211 to 5291 extending in the first direction may be provided between (i) a dielectric layer 5116 disposed over the top surface of one of the dielectric material regions 5112 and (ii) the dielectric layer 5116 disposed below the bottom surface of the next dielectric material region 5112. The conductive material regions 5221 to 5281 extending in the first direction may be provided between the dielectric material regions 5112. The top conductive material region 5291 extending in the first direction may be to provided over the uppermost dielectric material 5112. The conductive material regions 5211 to 5291 extending in the first direction may be made of or include a metallic material. The conductive material regions 5211 to 5291 extending in the first direction may be made of or include a conductive material such as polysilicon.

In the region between the second doping region 5312 and third doping region 5313, the same structures as the structures between the first and second doping regions 5311 and 5312 may be provided. For example, in the region between the second and third doping regions 5312 and 5313, the plurality of dielectric material regions 5112 extending in the first direction the plurality of pillars 5113 which are sequentially arranged in the first direction and pass through the plurality of dielectric material regions 5112 in the second direction, the dielectric layer 5116 which is provided over the exposed surfaces of the plurality of dielectric material regions 5112 and the plurality of pillars 5113, and the plurality of conductive material regions 5212 to 5292 extending in the first direction may be provided.

In the region between the third doping region 5313 and a fourth doping region 5314, the same structures as between the first and second doping regions 5311 and 5312 may be provided. For example, in the region between the third and fourth doping regions 5313 and 5314, the plurality of dielectric material regions 5112 extending in the first direction, the plurality of pillars 5113 which are sequentially arranged in the first direction and pass through the plurality of dielectric to material regions 5112 in the second direction, the dielectric layer 5116 which is provided over the exposed surfaces of the plurality of dielectric material regions 5112 and the plurality of pillars 5113, and the plurality of conductive material regions 5213 to 5293 extending in the first direction may be provided.

Drains 5320 may be respectively provided over the plurality of pillars 5113. The drains 5320 may be made of silicon materials doped with second type impurities. The drains 5320 may be made of silicon materials doped with n-type impurities. Although for the sake of convenience of explanation, the drains 5320 are exemplified as including n-type silicon it is noted that the drains 5320 are not limited to the n-type silicon. For example, the width of each drain 5320 may be larger than the width of each corresponding pillar 5113. Each drain 5320 may be provided in the shape of a pad over the top surface of each corresponding pillar 5113.

Conductive material regions 5331 to 5333 extending in the third direction may be provided over the drains 5320. Each of the conductive material regions 5331 to 5333 may be extendedly disposed over the drains 5320 serially arranged in the third direction with a preset separation distance to each other in the first direction. The respective conductive material regions 5331 to 5333 may be coupled electrically with the drains 5320 therebelow. The drains 5320 and the conductive material regions 5331 to 5333 extending in the third direction may be coupled electrically with through contact plugs. The conductive material regions 5331 to 5333 extending in the third direction may be made of a metallic material. The conductive material regions 5331 to 5333 extending in the third direction may be made of a conductive material such as polysilicon.

In FIGS. 5 and 6, the respective pillars 5113 may form strings together with the dielectric layer 5116 and the conductive material regions 5211 to 5291, 5212 to 5292 and 5213 to 5293 extending in the first direction. The respective pillars 5113 may form NAND strings NS together with the dielectric layer 5116 and the conductive material regions 5211 to 5291, 5212 to 5292 and 5213 to 5293 extending in the first direction. Each NAND string NS may include a plurality of transistor structures TS.

Figure 7:
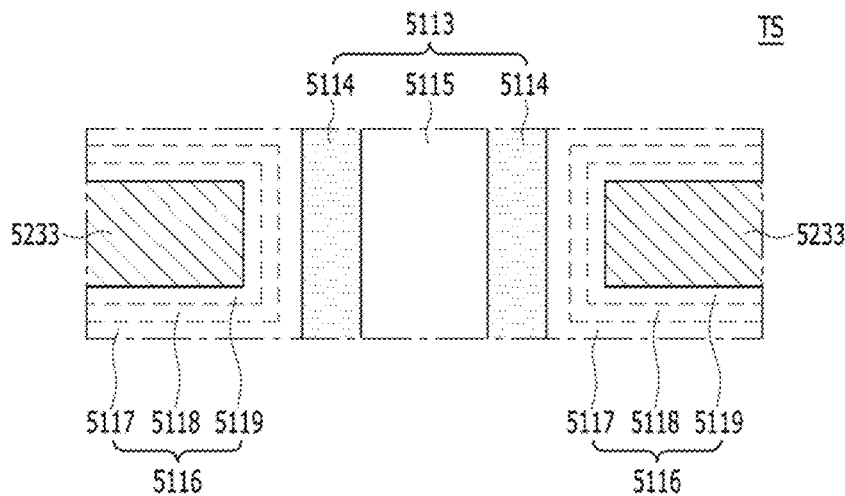

Referring now to FIG. 7, in the transistor structure TS shown in FIG. 6 the dielectric layer 5116 may include first to third sub dielectric layers 5117, 5118 and 5119.

The surface layer 5114 of p-type silicon in each of the pillars 5113 may serve as a body. The first sub dielectric layer 5117 adjacent to the pillar 5113 may serve as a tunneling dielectric layer, and may include a thermal oxidation layer.

The second sub dielectric layer 5118 may serve as a charge storing layer. The second sub dielectric layer 5118 may serve as a charge capturing layer, and may include a nitride layer or a metal oxide layer such as an aluminum oxide layer, a hafnium oxide layer, or the like.

The third sub dielectric layer 5119 adjacent to the conductive material 5233 may serve as a blocking dielectric layer. The third sub dielectric layer 5119 adjacent to the conductive material 5233 extending in the first direction may be formed as a single layer or multiple layers. The third sub dielectric layer 5119 may be a high-k dielectric layer such as an aluminum oxide layer, a hafnium oxide layer, or the like, which has a dielectric constant greater than the first and second sub dielectric layers 5117 and 5118.

The conductive material 5233 may serve as a gate or a control gate. For example, the gate or the control gate 5233, the blocking dielectric layer 5119, the charge storing layer 5118, the tunneling dielectric layer 5117 and the body 5114 may form a transistor or a memory cell transistor structure. For example, the first to third sub dielectric layers 5117 to 5119 may form an oxide-nitride-oxide (ONO) structure. In the embodiment, for the sake of convenience of explanation the surface layer 5114 of p-type silicon in each of the pillars 5113 be referred to as a body in the second direction.

The memory block BLki may include the plurality of pillars 5113, For example, the memory block BLKi may include the plurality of NAND strings NS. In detail, the memory block BLKi may include the plurality of NAND strings NS extending in the second direction or a direction perpendicular to the substrate 5111.

Each NAND string NS may include the plurality of transistor structures TS which are disposed in the second direction. At least one of the plurality of transistor structures TS of each NAND string NS may serve as a string source transistor SST. At least one of the plurality of transistor structures TS of each NAND string NS may serve as a ground select transistor GST.

The gates or control gates may correspond to the conductive material regions 5211 to 5291, 5212 to 5292 and 5213 to 5293 extending in the first direction. For example the gates or the control gates may extend in the first direction and form word lines and at least two select lines including at least one source select line SSL and at least one ground select line GSL.

The conductive material regions 5331 to 5333 extending in the third direction may be coupled electrically to one end of the NAND strings NS. The conductive material regions 5331 to 5333 extending in the third direction may serve as bit lines BL. For example, in one memory block BLKi, the plurality of NAND strings NS may be coupled electrically to one-bit line BL.

The second type doping regions 5311 to 5314 extending in the first direction may be provided to the other ends of the NAND strings NS, The second type doping regions 5311 to 5314 extending in the first direction may serve as common source lines CSL.

For example, the memory block BLKi may include a plurality of NAND strings NS extending in a direction perpendicular to the substrate 5111, e.g., the second direction, and may serve as a NAND flash to memory block, for example, of a charge capturing type memory, in which the plurality of NAND strings NS are coupled electrically to one-bit line BL.

Although it is illustrated in FIGS. 5 to 7 that the conductive material regions 5211 to 5291, 5212 to 5292 and 5213 to 5293 extending in the first direction are provided by nine (9) layers, it is noted that the conductive material regions 5211 to 5291, 5212 to 5292 and 5213 to 5293 extending in the first direction are not limited thereto, For example, conductive material regions extending in the first direction may be provided in eight (8) layers, sixteen (16) layers or any multiple layers. For example, in one NAND string NS, the number of transistors may be 8, 16 or more.

Although it is illustrated in FIGS. 5 to 7 that three (3) NAND strings NS are coupled electrically to one bit line BL, it is noted that the embodiment is not limited thereto. In the memory block BLKi, m NAND strings NS may be coupled electrically to one bit line BL, m being a positive integer. The number of conductive material regions 5211 to 5291, 5212 to 5292 and 5213 to 5293 extending in the first direction and the number of common source lines 5311 to 5314 may be varied with the number of NAND strings NS which are coupled electrically to one-bit line BL.

Further, although it is illustrated in FIGS. 5 to 7 that three (3) NAND strings NS are coupled electrically to one conductive material extending in the first direction, it is noted that the embodiment is not limited thereto. For example, n NAND strings NS may be coupled electrically to one conductive material extending in the first direction, n being a positive integer. The number of bit lines 5331 to 5333 may be varied with the number of NAND strings NS which are coupled electrically to one conductive material extending in the first direction.

Figure 8:
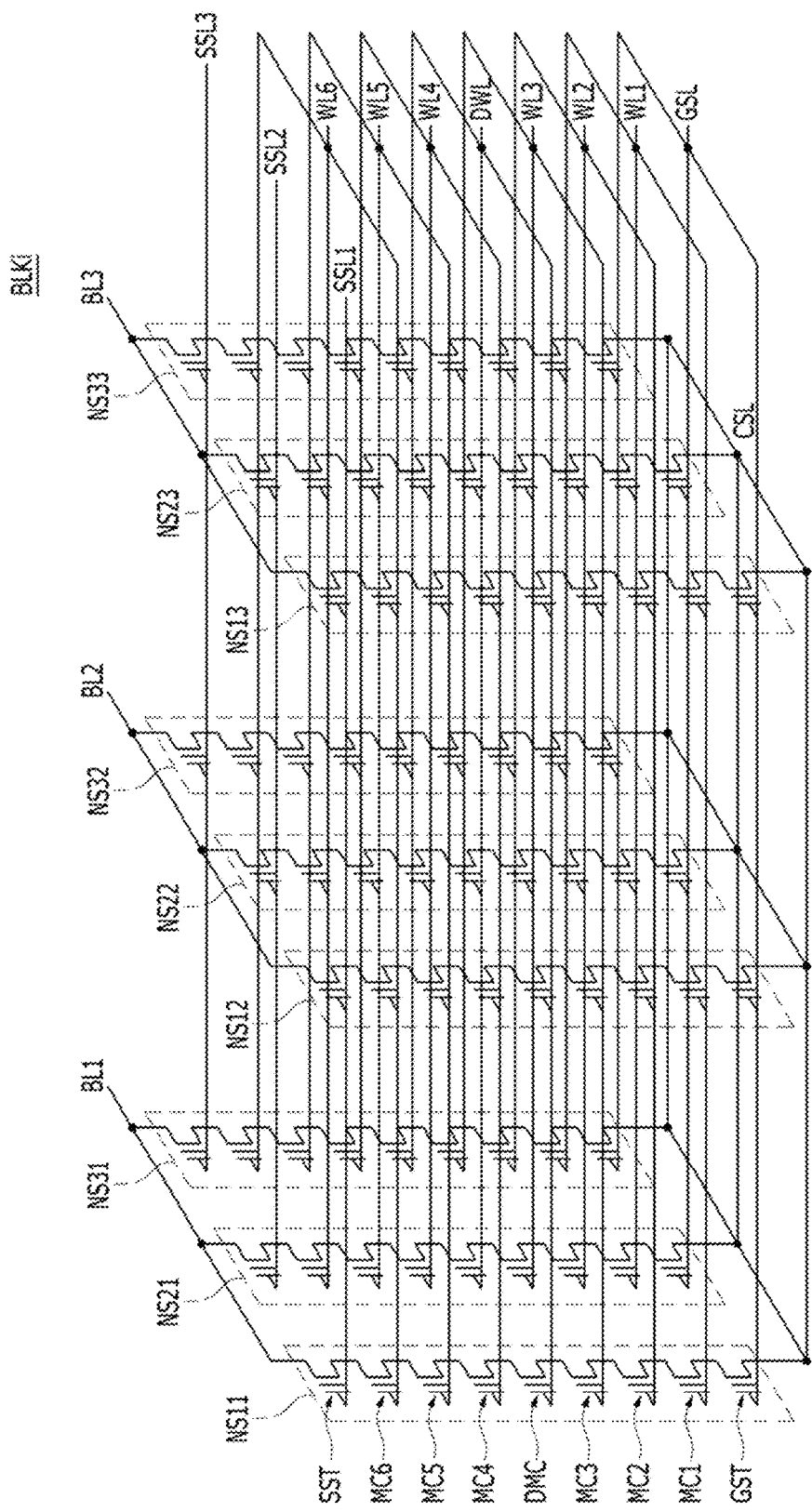

Referring to FIG. 8, in a block BLKi having the first structure, a plurality of NAND strings NS11 to NS31 may be provided between a first bit line BL1 and a common source line CSL. The first bit line BL1 may correspond to the conductive material region 5331 of FIGS. 5 and 6, extending in the third direction, NAND strings NS12 to NS32 may be provided between a second bit line BL2 and the common source line CSL. The second bit line BL2 may correspond to the conductive material region 5332 of FIGS. 5 and 6, extending in the third direction. NAND strings NS13 to NS33 may be provided between a third bit line BL3 and the common source line CSL. The third bit line BL3 may correspond to the conductive material region 5333 of FIGS. 5 and 6, extending in the third direction.

A source select transistor SST of each NAND string NS may be coupled electrically to a corresponding bit line BL. A ground select transistor GST of each NAND string NS may be coupled electrically to the common source line CSL. Memory cells MC1 and MC6 may be provided between the source select transistor SST and the ground select transistor GST of each NAND string NS.

In this example, the NAND strings NS may be defined by units to of rows and columns. The NAND strings NS which are coupled electrically to one-bit line may form one column. The NAND strings NS11 to NS31 which are coupled electrically to the first bit line BL1 may correspond to a first column. The NAND strings NS12 to NS32 which are coupled electrically to the second bit line BL2 may correspond to a second column. The NAND strings NS13 to NS33 which are coupled electrically to the third bit line BL3 may correspond to a third column. The NAND strings NS which are coupled electrically to one source select line SSL may form one row. The NAND strings NS11 to NS13 which are coupled electrically to a first source select line SSL1 may form a first row. The NAND strings NS21 to NS23 which are coupled electrically to a second source select line SSL2 may form a second row, The NAND strings NS31 to NS33 which are coupled electrically to a third source select line SSL3 may form a third row.

In each NAND string NS, a height may be defined. In each NAND string NS the height of the memory cell MC1 adjacent to the ground select transistor GST may have, for example, a value '1'. In each NAND string NS, the height of a memory cell may increase as the memory cell gets closer to the source select transistor SST when measured from the substrate 5111. For example, in each NAND string NS, the height of a memory cell MC6 adjacent to the source select transistor SST may have, for example, a value '7'.

The source select transistors SST of the NAND strings NS arranged in the same row may share the source select line SSL. The source select transistors SST of the NAND strings NS arranged in different rows may be respectively coupled electrically to the different source select lines SSL1, SSL2 and SSL3.

The memory cells at the same height in the NAND strings NS in the same row may share a word line WL. For example, at the same height, the word lines WL coupled electrically to the memory cells MC of the NAND strings NS in different rows may be coupled electrically with each other. Dummy memory cells DMC at the same height in the NAND strings NS of the same row may share a dummy word line DWL. For example, at the same height or level, the dummy word lines DWL coupled electrically to the dummy memory cells DMC of the NAND strings NS in different rows may be coupled electrically with each other.

The word lines WL or the dummy word lines DWL located at the same level or height or layer may be coupled electrically with each other for each of the layers where the conductive material regions 5211 to 5291, 5212 to 5292 and 5213 to 5293 extending in the first direction may be provided. The conductive material regions 5211 to 5291, 5212 to 5292 and 5213 to 5293 extending in the first direction may be coupled electrically in common to upper layers through contacts In other words, the ground select transistors GST of the NAND strings NS in the same row may share the ground select line GSL. Further, the ground select transistors GST of the NAND strings NS in different rows may share the ground select line GSL. For example, the NAND strings NS11 to NS13, NS21 to NS23 and NS31 to NS33 may be coupled electrically in common to the ground select line GSL.

The common source line CSL may be coupled electrically in common to the NAND strings NS. Over the active regions over the substrate 5111, the first to fourth doping regions 5311 to 5314 may be coupled electrically. The first to fourth doping regions 5311 to 5314 may be coupled electrically in common to an upper layer through contacts.

For example, as shown in FIG. 8, the word lines WL of the same height or level may be coupled electrically to each other. Accordingly, when a word line WL at a certain height is selected, all NAND strings NS which are coupled electrically to the selected word line WL may be selected. The NAND strings NS in different rows may be coupled electrically to different source select lines SSL. Accordingly, among the NAND strings NS coupled electrically to the same word line WL, by selecting one of the source select lines SSL1 to SSL3, the NAND strings NS in the unselected rows may be electrically isolated from the bit lines BL1 to BL3. In other words, by selecting, one of the source select lines SSL1 to SSL3, the NAND strings NS arranged in the same row as the selected source line may be selected. Furthermore, by selecting one of the bit lines BL1 to BL3, the NAND strings NS arranged in the same column as the selected bit line may be selected. Accordingly, only the NAND strings NS arranged in the same row as the selected source line and the same column as the selected bit line may be selected.

In each NAND string NS, a dummy memory cell DMC may be provided. In FIG. 8, for example, the dummy memory cell DMC may be provided between a third memory cell MC3 and a fourth memory cell MC4 in each NAND string NS. For example, first to third memory cells MC1 to MC3 may be provided between the dummy memory cell DMC and the ground select transistor GST. Fourth to sixth memory cells MC4 to MC6 may be provided between the dummy memory cell DMC and the source select transistor SST. The memory cells MC of each NAND string NS may be divided into two (2) memory cell groups by the dummy memory cell DMC. In the divided memory cell groups, memory cells, for example, MC1 to MC3, adjacent to the ground select transistor GST may be referred to as a lower memory cell group, and remaining memory cells, for example, MC4 to MC6, adjacent to the string select transistor SST may be referred to as an upper memory cell group.

Herein below, detailed descriptions will be made with reference to FIGS. 9 to 11, which show a memory device in a memory system, according to an embodiment implemented with a three-dimensional (3D) nonvolatile memory device different from the first structure.

Figure 9:
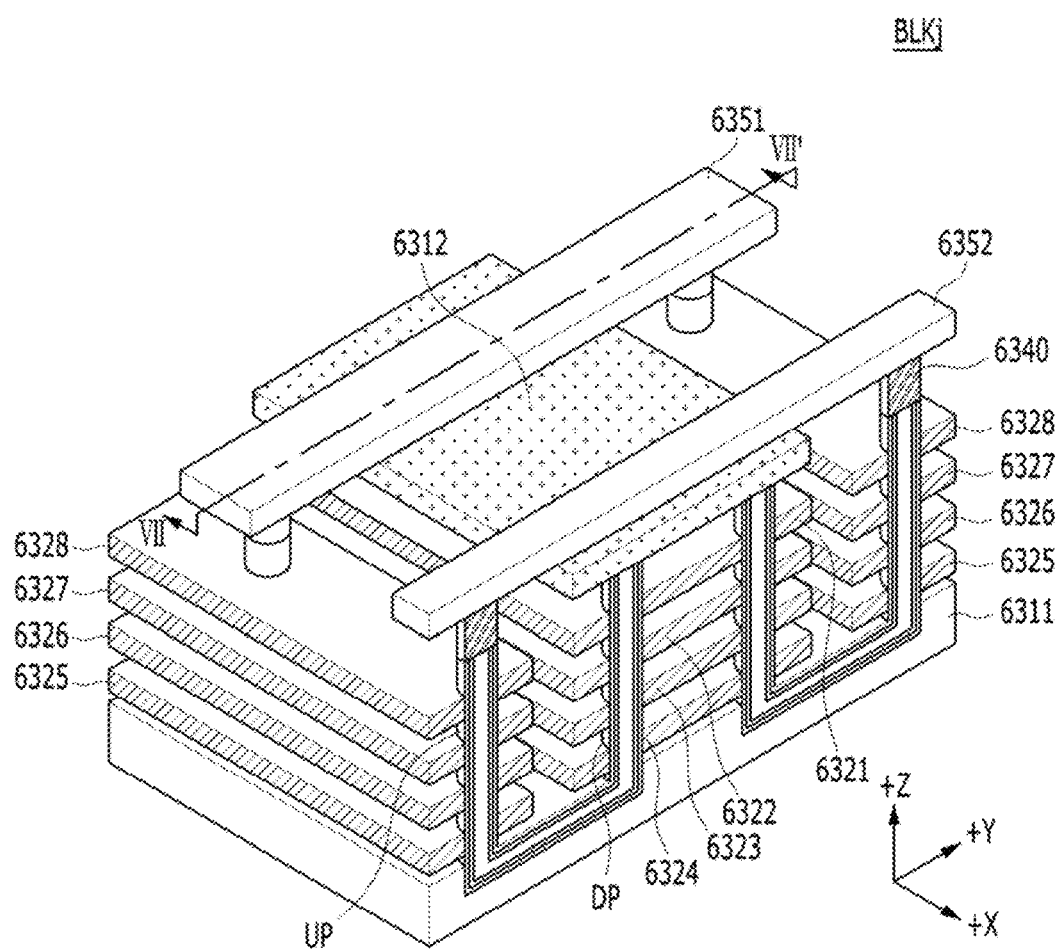

FIG. 9 is a perspective view schematically illustrating a memory device implemented with a three-dimensional (3D) nonvolatile memory device, which is different from the first structure described above with reference to FIGS. 5 to 8 and showing a memory block BLKj of the plurality of memory blocks of FIG. 4. FIG. 10 is a cross-sectional view illustrating the memory block BLKj taken along the line VII-VII' of FIG. 9.

Figure 10:
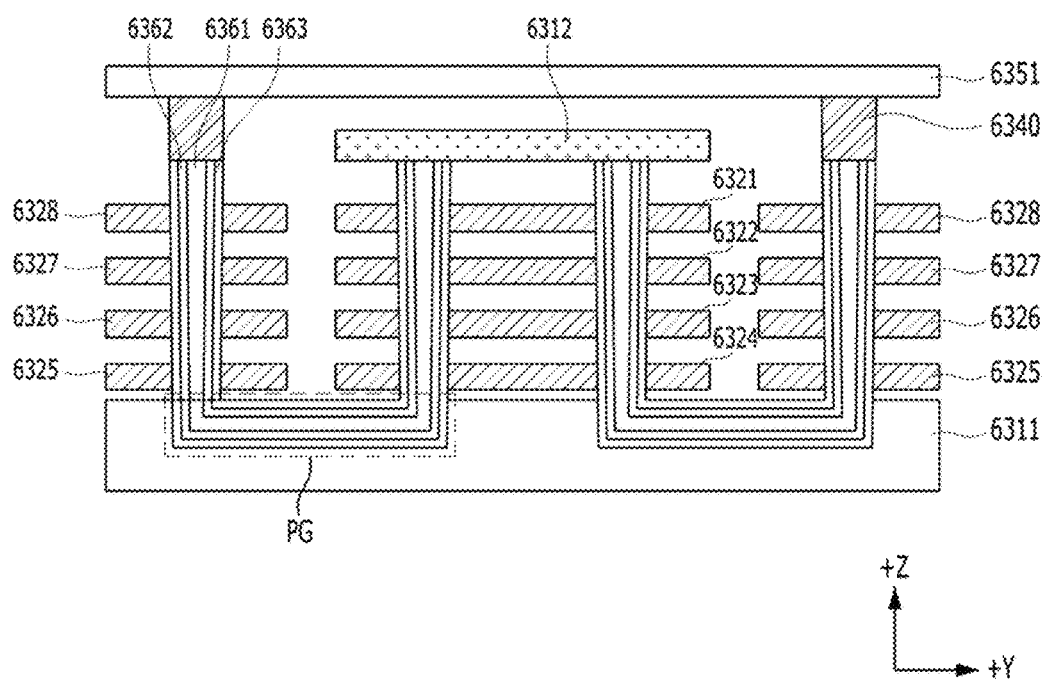

Referring to FIGS. 9 and 10, the memory block BLKj may include structures extending in the first to third directions and may include a substrate 6311. The substrate 6311 may include a silicon material doped with a first type impurity. For example, the substrate 6311 may include a silicon material doped with a p-type impurity. The substrate 6311 may be a p-type well, for example, a pocket p-well. The substrate 6311 may further include an n-type well which surrounds the p-type well. Although, in the described embodiment, the substrate 6311 is exemplified as being the p-type silicon, it is noted that the substrate 6311 is not limited to the p-type silicon.

First to fourth conductive material regions 6321 to 6324 extending in an x-axis direction and a y-axis direction are provided over the substrate 6311. The first to fourth conductive material regions 6321 to 6324 may be separated by a preset distance in the z-axis direction.

Fifth to eighth conductive material regions 6325 to 6328 extending, in the x-axis direction and the y-axis direction may be provided over the substrate 6311. The fifth to eighth conductive material regions 6325 to 6328 may be separated by the preset distance in the z-axis direction. The fifth to eighth conductive material regions 6325 to 6328 may be separated from the first to fourth conductive material regions 6321 to 6324 in the y-axis direction.

A plurality of lower pillars DP passing through the first to fourth conductive material regions 6321 to 6324 may be provided. Each lower pillar DP may extend in the z-axis direction. Also, a plurality of upper pillars UP passing through the fifth to eighth conductive material regions 6325 to 6328 may be provided. Each upper pillar UP may extend in the z-axis direction.

Each of the lower pillars DP and the upper pillars UP may include an internal material 6361, an intermediate layer 6362, and a surface layer 6363. The intermediate layer 6362 may serve as a channel of the cell transistor. The surface layer 6363 may include a blocking dielectric layer, a charge storing layer and a tunneling dielectric layer.

The lower and the upper pillars DP and UP may be coupled electrically with each other through a pipe gate PG. The pipe gate PG may be disposed in the substrate 6311. For example, the pipe gate PG may include the same material as the lower pillar DP and the upper pillar UP.

A doping material 6312 of a second type extending in the x-axis direction and the y-axis direction may be provided over the lower pillars DP. For example, the doping material 6312 of the second type may include an n-type silicon material. The doping material 6312 of the second type may serve as a common source line CSL.

Drains 6340 may be provided over the upper pillars UP. The drains 6340 may include an n-type silicon material. First and second upper conductive material regions 6351 and 6352 extending in the y-axis direction may be provided over the drains 6340.

The first and second upper conductive material regions 6351 to and 6352 may be spaced apart along the x-axis direction. The first and second upper conductive material regions 6351 and 6352 may be formed of a metal. The first and second upper conductive material regions 6351 and 6352 and the drains 6340 may be coupled electrically with each other through contact plugs. The first and second upper conductive material regions 6351 and 6352 may serve as first and second bit lines BL1 and BL2, respectively.

The first conductive material 6321 may serve as a source select line SSL. The second conductive material 6322 may serve as a first dummy word line DWL1. The third and fourth conductive material regions 6323 and 6324 may serve as first and second main word lines MWL1 and MWL2, respectively. The fifth and sixth conductive material regions 6325 and 6326 may serve as third and fourth main word lines MWL3 and MWL4, respectively. The seventh conductive material 6327 may serve as a second dummy word line DWL2. The eighth conductive material 6328 may serve as a drain select line DSL.

The lower pillar DP and the first to fourth conductive material regions 6321 to 6324 adjacent to the lower pillar DP may form a lower string. The upper pillar UP and the fifth to eighth conductive material regions 6325 to 6328 adjacent to the upper pillar UP may form an upper string. The lower string and the upper string may be coupled electrically with each other through the pipe gate PG. One end of the lower string may be coupled electrically to the doping material 6312 of the second type which serves as the common source line CSL. One end of the upper string may be coupled electrically to a corresponding bit line through the drain 6340. One lower string and one upper string may form one cell string which is coupled electrically between the doping material 6312 serving as the common source line CSL and a corresponding one of the upper conductive material layers 6351 and 6352 serving as the bit line BL.

For example, the lower string may include a source select transistor SST, the first dummy memory cell DMC1, and the first and second main memory cells MMC1 and MMC2. The upper string may include the third and fourth main memory cells MMC3 and MMC4, the second dummy memory cell DMC2, and a drain select transistor DST.

In FIGS. 9 and 10, the upper string and the lower string may form a NAND string NS. The NAND string NS may include a plurality of transistor structures TS. Since the transistor structure included in the NAND string NS in FIGS. 9 and 10 is described above in detail with reference to FIG. 7, a detailed description thereof will be omitted herein.

Figure 11:
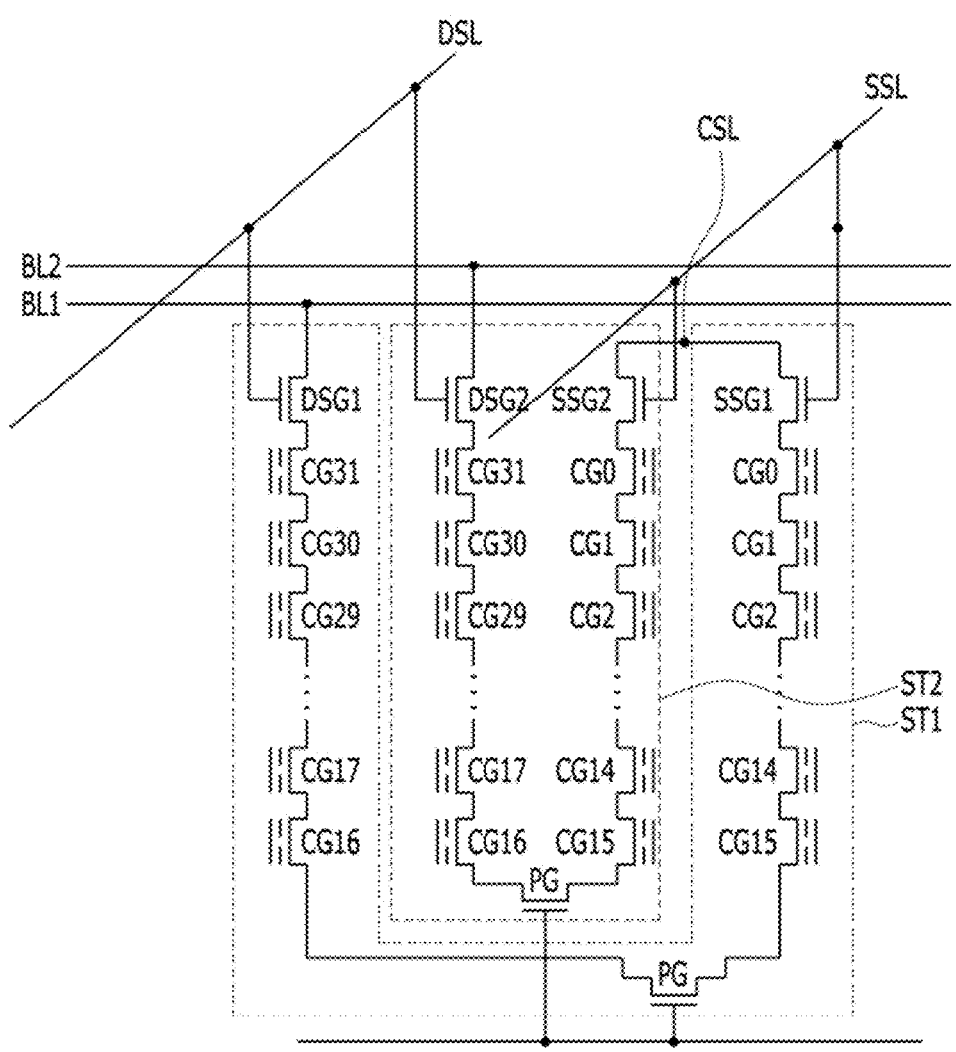

FIG. 11 is a circuit diagram illustrating the equivalent circuit of the memory block BLKj having the second structure as described above with reference to FIGS. 9 and 10. For the sake of convenience, only a first string ST1 and a second string ST2 are shown, forming a pair in the memory block BLKj in the second structure.

Referring to FIG. 11, in the memory block BLKj having the second structure, a plurality of cell strings, each of which is implemented with one upper string and one lower string coupled electrically through the pipe gate PG as described above with reference to FIGS. 9 and 10, may be provided, in such a way as to define a plurality of pairs.

For example, in memory block BLKj having the second structure, memory cells CG0 to CG31 stacked along a first channel CH1 (not shown), for example, at least one source select gate SSG1 and at least one drain select gate DSG1 may form a first string ST1, and memory cells CG0 to CG31 stacked along a second channel CH2 (not shown), for example at least one source select gate SSG2 and at least one drain select gate DSG2 may form a second string ST2.

The first and the second strings ST1 and ST2 may be coupled electrically to the same drain select line DSL and the same source select line SSL. The first string ST1 may be coupled electrically to a first bit line BL1. The second string ST2 may be coupled electrically to a second bit line BL2.

Although FIG. 11 shows the first string ST1 and the second string ST2 are coupled electrically to the same drain select line DSL and the same source select line SSL, it may be envisaged that the first string ST1 and the second string ST2 may be coupled electrically to the same source select line SSL and the same bit line BL, the first string ST1 may be coupled electrically to a first drain select line DSL1 and the second string ST2 may be coupled electrically to a second drain select line DSL2. Further it may be envisaged that the first string ST1 and the second string ST2 may be coupled electrically to the same drain select line DSL to and the same bit line BL, the first string ST1 may be coupled electrically to a first source select line SSL1 and the second string ST2 may be coupled electrically a second source select line SSL2.

Meanwhile, when the memory device 150, which is a NAND flash memory device, operates in response to a certain operation command, such as a read, write, or erase command, the memory device 150 may provide its status information of a predetermined size (e.g., 8-bit or 1-byte data) upon receipt of a status read command. Typically, 8-bit data has been enough to include information on the state of a memory device. However, as technology of memory devices advances, commands become more complicated and it becomes increasingly more difficult to store the information on the states of all memory devices in 8-bit data. For example, when a memory device has a four-plane structure and a concurrent write command is made for the memory device along with a cache write command, 8-bit status information may only represent whether the commands are carried out successfully or fail, Thus, the 8-bit status information has no room for storing busy information and write protection information.

The following embodiments of the present invention may remove the above-described limitation, According to the embodiments of the present invention, status information is hierarchical information that includes (k+n) bytes of data. The "k" bytes of data may represent representative status information among plural pieces of status information. The "n" bytes of data may represent detailed status information, which is more specific information than the "k"-byte status information. The number of bytes allocated for status information may be increased to represent more detailed information, As described above, status information may be formed to show the state of a memory device by referring to the representative information on the memory device. In some cases, the detailed status information has to be referred to in addition to the representative status information to detect the state of a memory device. Even so when the state of the memory device may be sufficiently detected based on the representative status information, the performance of the memory device may be expected to be improved by not additionally transferring detailed status information.

Figure 12:
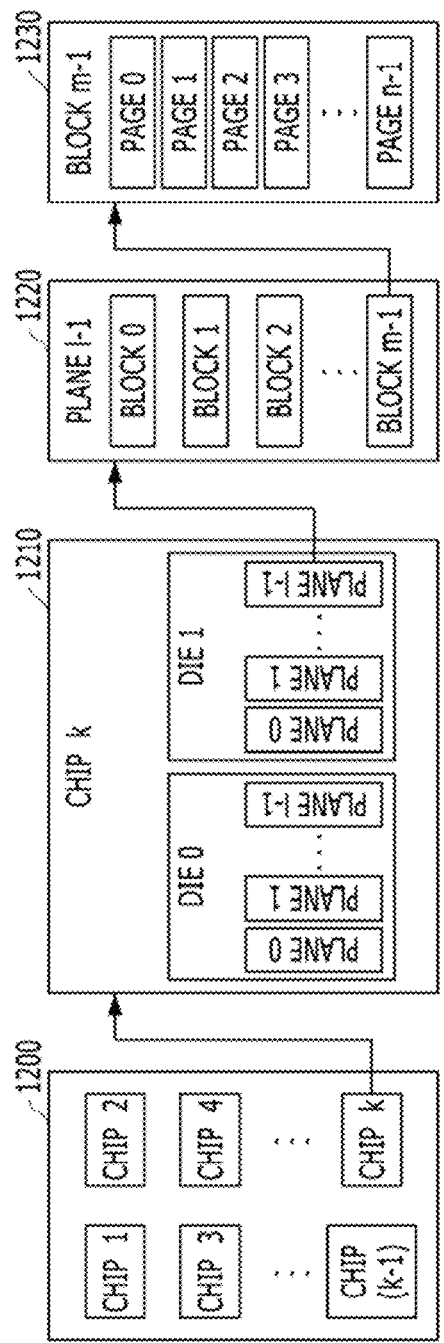
FIG. 12 illustrates a memory device, according to a first embodiment of the present invention.

FIG. 12 shows a structure of a memory device 1200 according to a first embodiment of the present invention. The memory device 1200 may include a plurality of planes. It is assumed, for illustration purposes, that there is a technical in representing the states of all the planes within a predetermined size (e.g., one byte) of status information. Further, it is described, as an example in FIG. 12, that the memory device 1200 performs a multi-plane operation and the states of the memory device 1200 are not represented by the status information of a predetermined size. As will be described below in detail, the present invention may be applied to a case where the memory device 1200 has various states which are not represented by status information of a predetermined size.

According to the embodiment of FIG. 12, the memory device 1200 may include a plurality of memory chips CHIP1 to CHIPk. Each memory chip may include a plurality of dies, and each die may include a plurality of planes. For example, a kth memory chip 1210 includes two dies DIE0 and DIE1 and each die includes a plurality of planes PLANE0 to PLANEn−1. Each of the planes PLANE0 to PLANEl−1 may include a plurality of blocks. Each of the blocks includes a plurality of pages. For example, an l−1th plane 1220 may include m blocks BLOCK0 to BLOCKm−1. An m−1th block 1230 may include n pages PAGE0 to PAGEn−1. The memory device 1200 having this structure may perform a multi-plane operation and as many pieces of state status information as the number of the plurality of the states are required to be generated.

Figure 13:
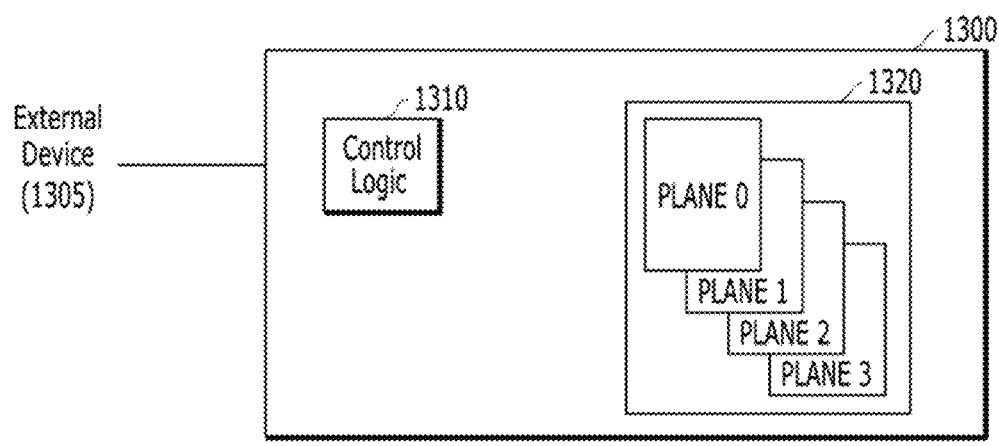
FIG. 13 illustrates a memory device, according to a second embodiment of the present invention.

FIG. 13 is a block view of a memory device 1300, according to a second embodiment of the present invention.

According to the embodiment of FIG. 13, the memory device 1300 may include a control logic 1310 and a memory unit 1320. The control logic 1310 is coupled with an external device 1305. According to the embodiment of the present invention, the memory device 1300 may be a constituent element corresponding to the memory device 150 of the memory system 110 of FIG. 1. In an embodiment, the external device 1305 may correspond to the host 102 shown in FIG. 1. According to another embodiment, the external device 1305 may correspond to the memory controller 131 shown in FIG. 1.

The memory unit 1320 may include a plurality of planes, for example, four planes PLANE0 to PLANE3 as illustrated in FIG. 13. Referring to the following FIGS. 16A and 16B, which will be described later on, the memory unit 1320 may have a plurality of states. Each of the planes PLANE0 to PLANE3 may include a plurality of blocks which are data storage regions, as shown in FIG. 12. Also, each of the planes PLANE0 to PLANE3 may include a cache (or a buffer memory) (not shown) as a temporary storage region.

The control logic 1310 controls the general operation of the memory unit 1320. For example, the control logic 1310 may control the memory unit 1320 to operate in response to an operation command, such as, for example, a read command, a write command (also referred to as a program command), and an erase command, transferred from the external device 1305 to the memory device 1300.

The control logic 1310 may generate status information corresponding to an operation result for the operation in the memory unit 1320, According to diverse embodiments of the present invention, the status information may include representative status information representing common states of the planes PLANE0 to PLANE3 of the memory unit 1320, and detailed status information representing individual states of the planes PLANE0 to PLANE3 that are different from each other. The representative status information may have a size of 'k' bytes. The detailed status information may have a size of 'n' bytes, where k may be smaller than n. In the illustrated embodiment, the detailed status information may show whether the operation command is successfully carried out for each of the planes PLANE0 to PLANE3 of the memory unit 1320, whereas the representative status information representing the common state of the planes PLANE0 to PLANE3 may show whether the operation command is successfully carried out for the memory unit 1320.

The control logic 1310 may transfer the representative status information to the external device 1305 among the status information that is generated based on the operation result performed in the memory unit 1320. Also, the control logic 1310 may transfer the detailed status information to the external device 1305 among the status information that is generated based on the operation result performed in the memory unit 1320. In this embodiment of the present invention, the control logic 1310 may transfer the representative status information to the external device 1305 in response to a status read command transferred from the external device 1305. According to another embodiment of the present invention, the control logic 1310 may transfer the detailed status information to the external device 1305 in response to an additional status read command that is applied from the external device 1305.

Figure 14:
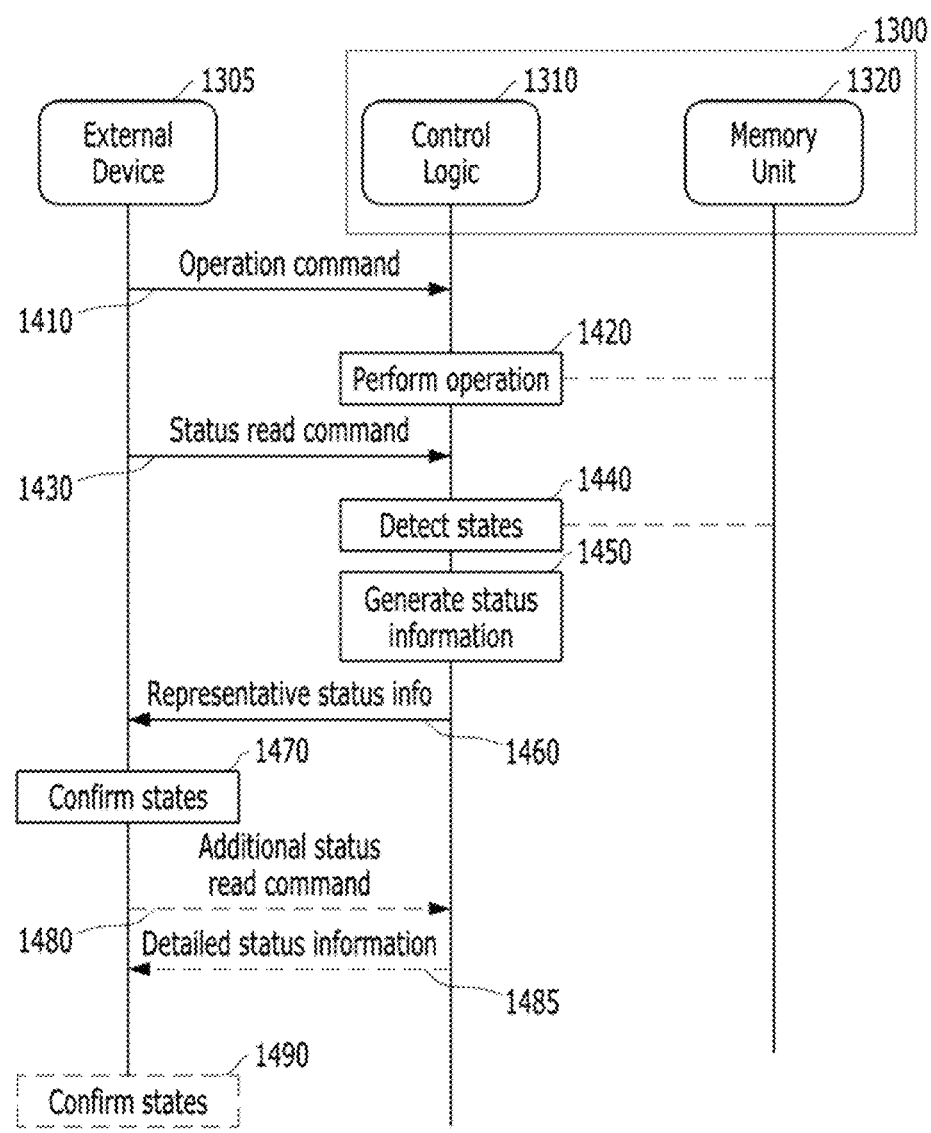
FIG. 14 illustrates a method of processing status information, according to an embodiment of the present invention.

Referring to FIG. 14, the external device 1305 transfers an operation command to the memory device 1300 in step S1410.

In step S1420, the control logic 1310 of the memory device 1300 performs a particular operation corresponding to the operation command on the memory unit 1320 upon receipt of the operation command. For example, the control logic 1310 may perform a read operation, a write (program) operation, or an erase operation on the memory unit 1320.

In step S1430, the external device 1305 transfers a status read command for reading the states of the memory unit 1320 resulted from the particular operation performed thereon.

In step S1440, the control logic 1310 detects the states of the memory unit 1320, and in step S1450 generates status information representing the detected states. For example, the control logic 1310 generates the status information shown in FIGS. 15, 16A and 16B.

In step S1460, the control logic 1310 transfers the status information representing the states of the memory unit 1320 to the external device 1305. Herein, the transferred status information may include representative status information representing common states (refer to FIGS. 15 and 16A).

In step S1470, the external device 1305 receives the status information, which is the representative status information, from the control logic 1310, and checks out the states of the memory unit 1320 based on the received status information. Steps S1480, S1485 and S1490 may be optionally performed following the step S1470.

When the state of the memory unit 1320 is not confirmed from the received status information, in step S1480, the external device 1305 transfers additional status read command to the control logic 1310. In step S1485, the control logic 1310 transfers the detailed status information representing the differentiated states of the memory unit 1320 to the external device 1305. Herein, the transferred status information may include the detailed status information that represent individual states (refer to FIGS. 15 and 16B). In step S1490, the external device 1305 receives the detailed status information from the control logic 1310, and checks out the states of the memory unit 1320 based on the detailed status information.

Figure 15:
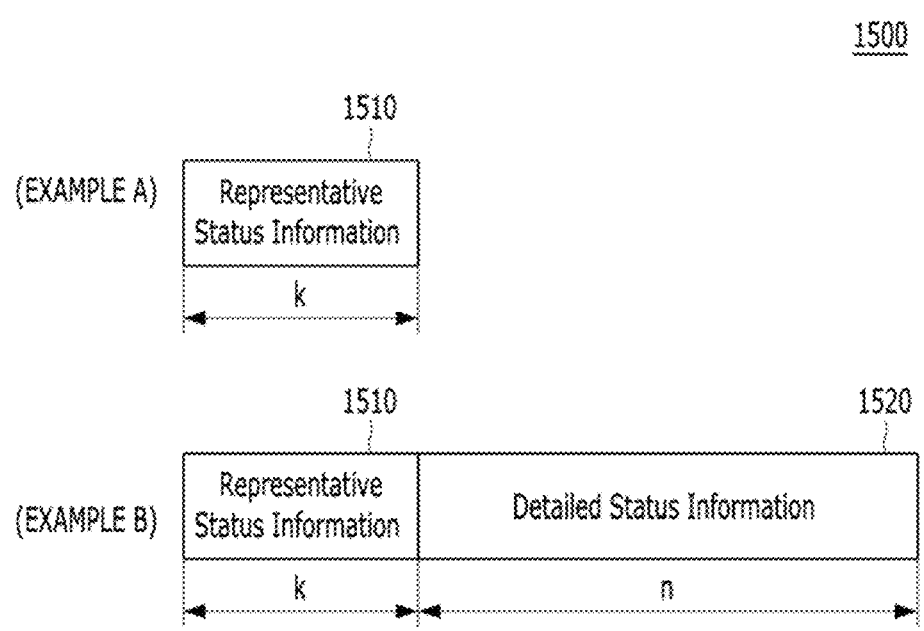
FIG. 15 shows examples of status information, according to an embodiment of the present invention.

FIG. 15 shows examples of the status information, according to an embodiment of the present invention. The status information may show the states of the memory unit 1320 of the memory device 1300 illustrated in FIG. 13, and may be generated by the control logic 1310, The examples of the status information shown in FIG. 15 are not restrictive but illustrative only. Therefore, there may be other examples of the status information that do not depart from the concept and scope of the present invention.

Referring to FIG. 15, the status information 1500 may include representative status information 1510 in an example A. For example, the status information 1500 may be of a predetermined status information transfer unit, e.g., 'k' bytes. In the example A, the external device 1305 may decide the states of the memory unit 1320 based on the status information 1500 that includes the representative status information 1510 generated by the control logic 1310 of the memory device 1300.

In an example B, the status information 1500 may include the representative status information 1510 and detailed status information 1520. For instance, the representative status information 1510 may have a size of k bytes (or bits), and the detailed status information 1520 may have a size of n bytes (or bits). According to an embodiment of the present invention, k may be smaller than n. For example k bytes may be one byte or 8 bits. In the example B, the external device 1305 does not confirm the states of the memory unit 1320 based on the status information 1500 that includes the representative status information 1510 generated by the control logic 1310 of the memory device 1300, and it may further require the detailed status information 1520 additionally generated.

Figure 16A:
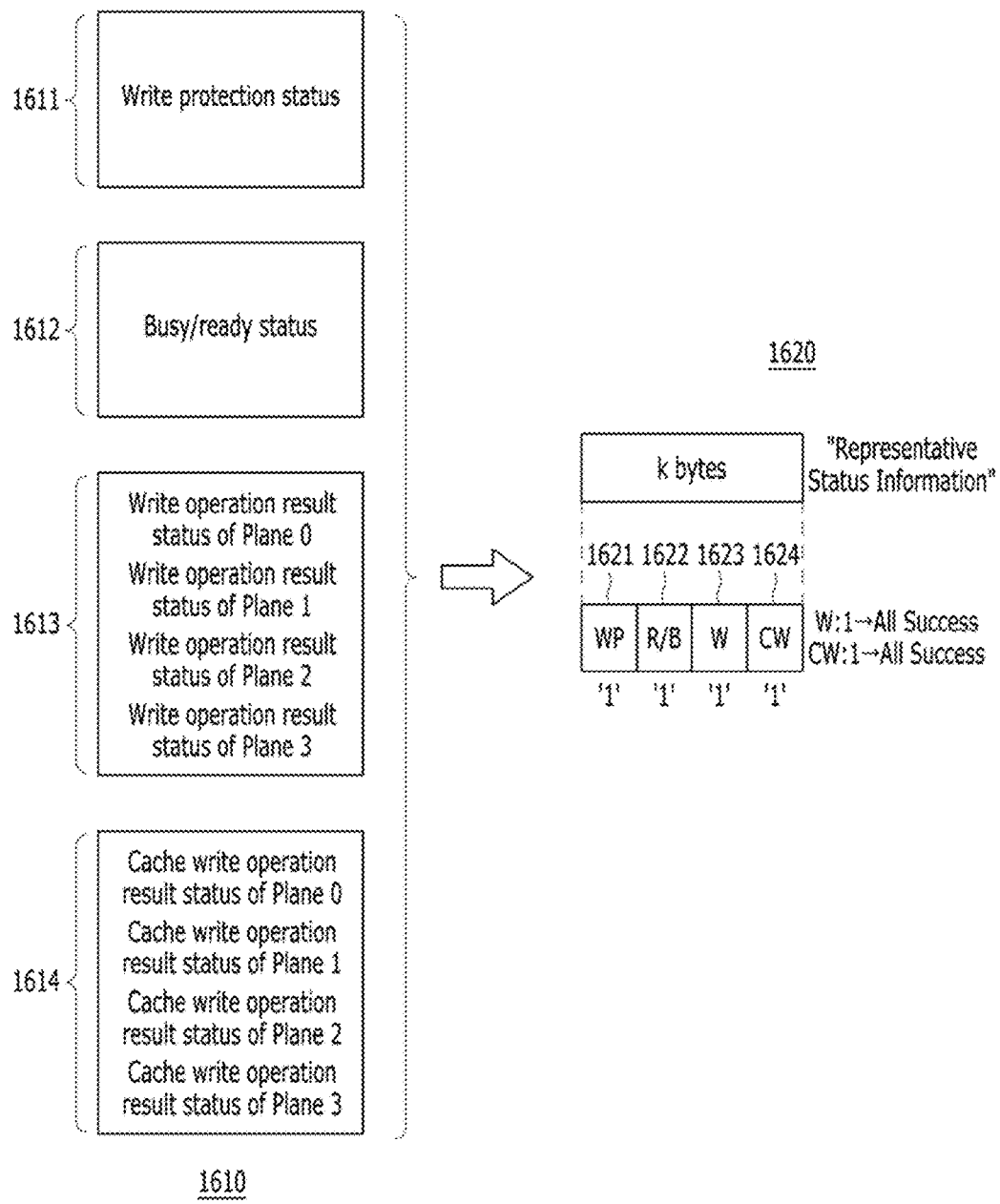
FIGS. 16A and 16B show examples of a status information generation operation, according to an embodiment of the present invention.
Figure 16B:
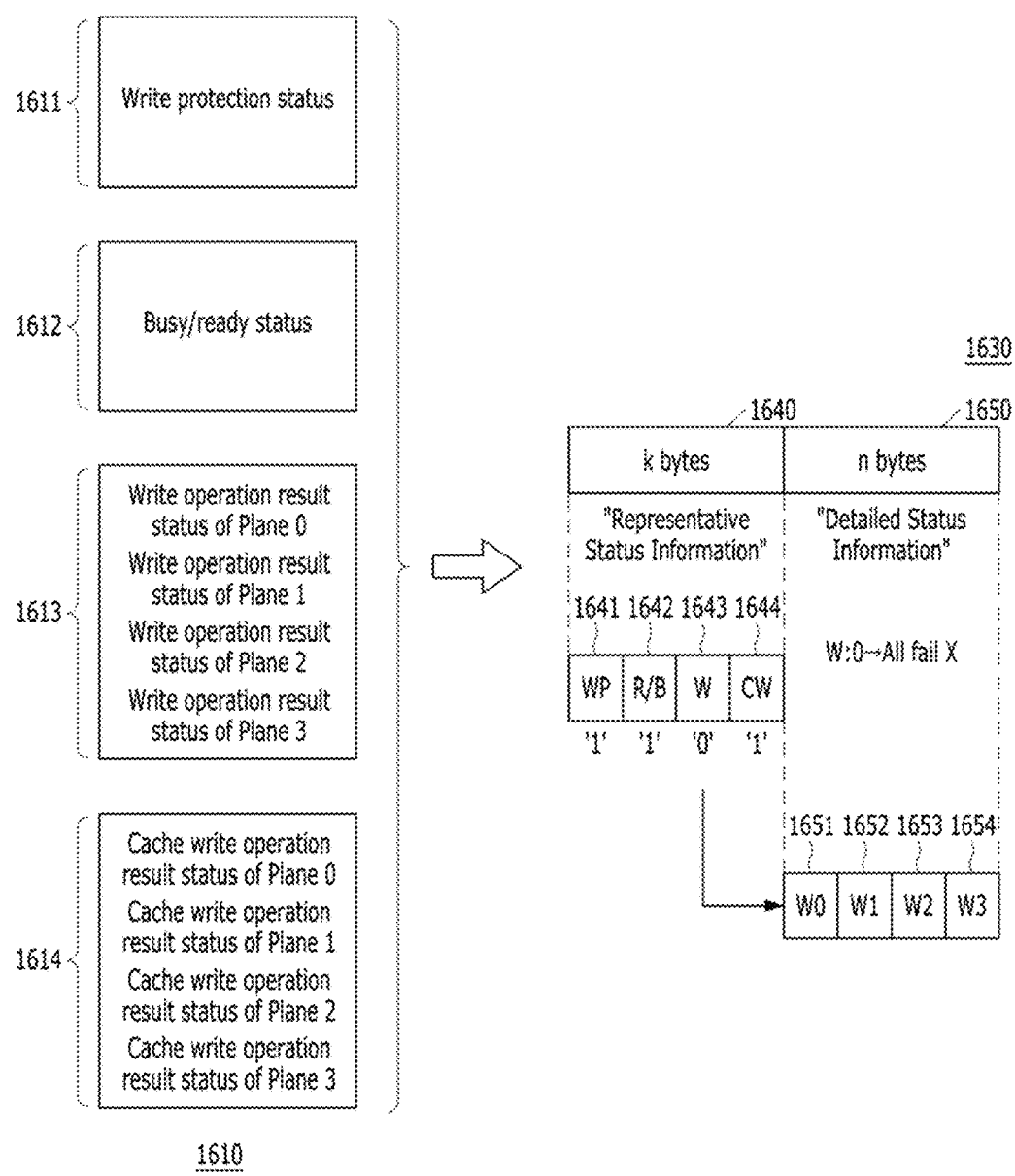

FIGS. 16A and 16B show examples of a status information generation operation according to embodiments of the present invention. The status information generation operation may be performed by the control logic 1310 illustrated in FIG. 13. The examples of the status information shown in FIGS. 16A and 16B show diverse statuses of the memory unit 1320 illustrated in FIG. 13. The diverse statuses respectively correspond to the operation results obtained according to the operation command by the control logic 1310 illustrated in FIG. 11 The examples of the status information shown in FIGS. 16A and 16B are not restrictive but illustrative only, and there may be other examples of the status information that do not depart from the concept and scope of the embodiments of the present invention.

Referring to FIGS. 16A and 166, the statuses 1610 of the memory unit 1320 may include a write protection status 1611, a busy/ready status 1612, a write operation result status 1613, and a cache write operation result status 1614. The write protection status 1611 and the busy/ready status 1612 may be the statuses of one memory unit 1320. On the other hands, the write operation result status 1613 and the cache write operation result status 1614 may be the statuses of the planes included in the memory unit 1320. An operation for detecting more specific states of the memory unit 1320 may be carried out through a known operation. For example, when performing a write operation on the planes of the memory unit 1320 by driving a voltage generator, a row decoder, and a column decoder that are included in a peripheral circuit (not shown) of the memory device 1300, the control logic 1310 may detect the results of the write operation, that is, the states of the planes after the write operation, by performing a read operation thereon. According to another example, when performing a cache write operation in a cache (or a buffer memory) included in the memory unit 1320, the control logic 1310 may detect the result of the cache write operation, that is, the state of the cache after the cache write operation, by performing a read operation on the cache.

The control logic 1310 may detect the states of the memory unit 1320 and generate corresponding status information. According to the example shown in FIG. 16A, the status information may include representative status information. According to another example shown in FIG. 16B, the status information may include representative status information and detailed status information. The representative status information may be defined by a dominant status of the states of the memory unit 1320. In an embodiment, the representative status information may represent whether all the states of the memory unit 1320 have the dominant status or not. For example, in case of a flash memory device, almost all the write operations that are performed in the flash memory device in response to a write command are likely to succeed with a probability of approximately 99%. Thus, for example, in a flash memory device, the dominant status may be 'success' and hence the representative status information may also be a 'success' whereas an individualized state of a plane may be a 'fail.'

Referring to FIG. 16A, status information 1620 may include representative status information of a predetermined size (e.g., k bytes). The status information 1620 may include write protection representative status information WP 1621 for a write protection status, ready/busy representative status information R/B 1622 for a ready/busy status, write representative status information W 1623 for a write operation result status, and cache write representative status information CW 1624 for a cache operation result status. For example, the representative status information may have a value of '1', individually. If the write representative status information W 1623 has a value of '1', it means that the write operation results for all the planes are 'all success'. If the cache write representative status information CW 1624 has a value of '1', it means that the cache write operation results of a cache for all the planes are 'all success'.

In response to a status read command, the control logic 1310 transfers generated status information to the external device 1305. The external device 1305 then may confirm all the states of the memory unit 1320 based on the representative status information included in the received status information 1620.

Referring to FIG. 16B, status information 1630 may include representative status information 1640 of a predetermined size (e.g., k bytes) and detailed status information 1650 of a predetermined size (e.g., n bytes). The representative status information 1640 may include write protection representative status information WP 1641 for a write protection status, ready/busy representative status information R/B 1642 for a ready/busy status, write representative status information W 1643 for a write operation result status, and cache write representative status information CW 1644 for a cache write operation result status. For example, the write protection representative status information WP 1641, and the ready/busy representative status information R/B 1642, and the cache write representative status information CW 1644 may have a value of '1', individually, and the write representative status information W 1643 may have a value of '0'. If the write representative status information W 1643 has a value of '0', it means that the write operation results for all the planes are not success. If the cache write representative status information CW 1644 has a value of '1', it means that the write operation results of a cache for all the planes are 'all success'.

In response to a status read command, the control logic 1310 transfers generated status information to the external device 1305. Then, the external device 1305 may confirm the states of the memory unit 1320 based on the representative status information included in the received status information 1620. Herein, due to the write representative status information W 1643 having a value of '0', the external device 1305 cannot decide the write operation result for all the planes. Therefore, the external device 1305 may transfer an additional status read command to the control logic 1310, and the control logic 1310 may transfer information on the specific results of the write operations performed on all the planes to the external device 1305 upon receipt of the additional status read command.

According to the embodiments of the present invention described above, the status information representing a plurality of states of the memory device 1300 may be formed to include representative status information which represents common states among the statuses, thereby minimizing the storage space of the status information. In case of a memory device having a 4-plane structure, the memory device may have 10 states, which is presented in FIGS. 16A and 16B. In this case, if the status information is defined to have a predetermined size (e.g., 1 byte) and each status has to be represented by one bit, it is impossible to represent all the 10 states with one status information because it comes to take 10 bits to represent the 10 statuses. However, according to the embodiments of the present invention, the status information may be formed to include only a representative status, and it is possible to represent a plurality of states (e.g., 10 states) with status information of a small size (e.g., 1 byte or 8 bits). Since almost all the write operations performed in a memory device are likely to succeed stochastically with a probability of approximately 99%, the status information formed of representative status information alone are quite useful.

Figure 17:
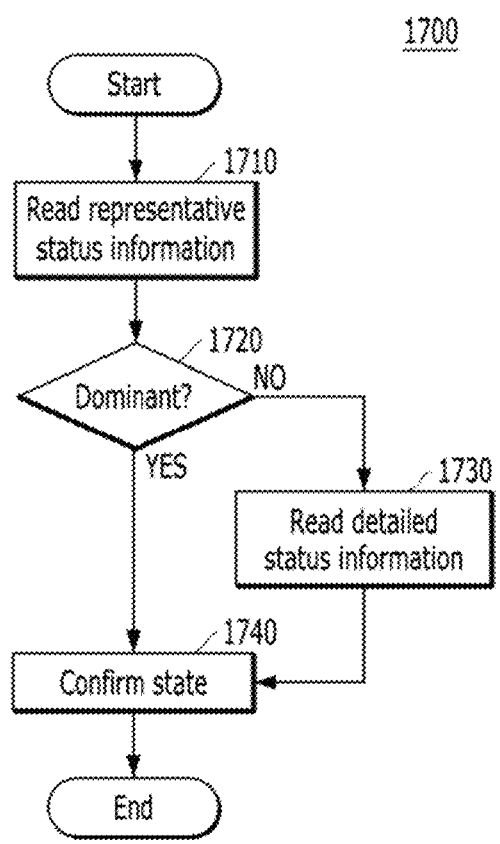
FIG. 17 is a flowchart describing how an external device processes status information, according to an embodiment of the present invention.

FIG. 17 is a flowchart describing how an external device processes status information, according to an embodiment of the present invention. The status information processing 1700 is carried out by the external device 1305 when the external device 1305 receives the status information on the memory unit 1370 from the control logic 1310.

The external device 1305 transfers a status read command to the control logic 1310 of the memory device 1300. When the control logic 1310 transfers status information including representative status information to the external device 1305, the external device 1305 performs a read operation on the representative status information (e.g., k bytes shown in FIGS. 15 and 16A), which is transferred from the control logic 1310 in step S1710.

In step S1720, the external device 1305 decides whether the received representative status information is dominant or not. As mentioned earlier, since almost all the write operations performed in a flash memory device in response to a write command are likely to succeed with a probability of approximately 99%, the dominant status is 'success', and the representative status information includes 'all success' and the other.

If it is decided that the representative status information is dominant, the external device 1305 confirms the state of the memory unit 1320 in step S1740. If it is decided that the representative status information is not dominant, the external device 1305 transfers an additional status read command to the control logic 1310 of the memory device 1300. The control logic 1310 then transfers status information that includes detailed status information in response to the additional status read command, and the external device 1305 performs read operation on the detailed status information (which is n bytes shown in FIGS. 15 and 16B), which is transferred from the control logic 1310, in step S1730. The external device 1305 then checks out the detailed status information and decides the state of the memory unit 1320 in step S1740.

The number of the states of a memory device, such as a memory device having a structure of four or more planes, is increased nowadays and thus it becomes difficult to represent the states by status information of a predetermined size (e.g., 1 byte). However, according to an embodiment of the present invention, performance of the memory device may be improved by transmitting representative status information, compared with a case where the number of status read commands or the number of kinds of information are increased as the number of the states is raised.

While the present invention has been described with respect to the specific embodiments, it will be apparent to those skilled in the art that various changes and modifications may be made without departing from the spirit and scope of the invention as defined in the following claims. For example, the embodiments of the present invention are described for a memory device having a plurality of sates and applied to a memory system, However, the technology of the present invention may be applied to a data processing system including a host and devices that use a transmission protocol of long status read time due to a great deal of status data as well. The performance of the data processing system may be optimized by grouping dominant statuses into a representative status and processing them in the similar manner introduced in the embodiments of the present invention.

What is claimed is:

1. A memory device, comprising:
   a memory unit comprising one or more storage regions; and
   a control logic to perform a command operation to the storage regions in response to an operation command transferred from an external device, generating status information including representative status information and detailed status information, after the command operation is performed, in response to a status read command from the external device, and transferring the representative status information to the external device in response to the status read command,
   wherein the external device transfers an additional status read command in response to determining that the representative status does not have a first state,
   wherein the control logic transfers the detailed status information to the external device in response to the additional status read command from the external device,
   wherein the representative status information represents whether the command operation is completed in all of the storage regions or not,
   wherein the representative status information has the first state when the operation command is successfully carried out in all of the storage regions,
   wherein the detailed status information represents an individual result of the command operation performed on each of the storage regions, and
   wherein the detailed status information represents each individualized states of all of the storage regions in which the command operation is performed respectively.

2. The memory device of claim 1, wherein the representative status information has a size of k bytes, and the detailed status information has a size of n bytes, where k and n are natural numbers, and k is smaller than n.

3. The memory device of claim 1, wherein the memory unit includes a plurality of planes as the one or more storage regions, and
   wherein the detailed status information represents the individual result of the command operation performed on each of the storage regions correspond to a write result status, and a cache write operation result status.

4. The memory device of claim 1, wherein the representative status information and the detailed status information are hierarchical.

5. A method for operating a memory device with a control logic and a memory unit including one or more storage regions, the method comprising:
   performing, by the control logic, a command operation to the one or more storage regions in response to an operation command transferred from an external device and detecting, by the control logic, states of the storage regions in which the command operation is performed;
   generating, by the control logic, status information including representative status information and detailed status information in response to a status read command transferred from an external device;
   transferring, by the control logic, the representative status information to the external device in response to the status read command; and
   additionally transferring, by the control logic, the detailed status information to the external device in response to an additional status read command transferred from the external device only when the representative status information do not have a first state,
   wherein the representative status information represents whether the command operation is performed in all the storage regions have the first state or not,
   wherein the representative status information has the first state when the operation command is successfully carried out in all of the storage regions, and
   wherein the detailed status information represents individual result of the command operation performed on each of the storage regions, respectively.

6. The method of claim 5, wherein the representative status information has a size of k bytes, and the detailed status information has a size of n bytes, where k and n are natural numbers, and k is smaller than the n.

7. The method of claim 5, wherein the memory unit includes a plurality of planes as the one or more storage regions, and wherein the detailed status information represents the individual result of the command operation performed on each of the storage regions correspond to a write result status, and a cache write operation result status.

8. A method for operating a memory system including a host and a memory device including a memory unit comprising one or more storage regions, the method comprising:
   transferring, by the host, an operation command to the memory device;

performing, by the memory device, a command operation on the memory device in response to the operation command transferred from the host;

transferring, by the host, a status read command to the memory device to read the representative status information of the memory device after the command operation is performed;

in response to receiving the status read command, generating status information including representative status information and detailed status information;

transferring, by the memory device, the representative status information representing whether the command operation is performed in all the storage regions in which the command operation is performed have a first state or not in response to the status read command;

reading, by the host, the representative status information from the memory device; and confirming, by the host, the plurality of the states of the memory device based on the representative status information when the representative status information has the first state, wherein the host transfers an additional status read command to the memory device to read the detailed status information representing each individualized states of all the storage regions in which the command operation is performed only when the representative status information do not have the first state, wherein the representative status information has the first state represents that the command operation is successfully carried out in all the storage regions, and wherein each of the individualized states represents an individual result of the command operation performed on each of the storage regions, respectively.

9. The method of claim 8, wherein the memory device includes a plurality of planes, and the plurality of states correspond to respective states of the planes in at least one among a write protection status, a busy/ready status, a write operation result status, and a cache write operation result status.

10. The method of claim 9, wherein the representative status information has a size of k bytes, and the detailed status information has a size of n bytes, where k and n are natural numbers, and k is smaller than n.

* * * * *